(12) United States Patent
Hayes

(10) Patent No.: US 8,952,977 B2
(45) Date of Patent: Feb. 10, 2015

(54) PSEUDO-RANDOM INTERVAL ARITHMETIC SAMPLING TECHNIQUES IN COMPUTER GRAPHICS

(75) Inventor: Nathan T. Hayes, Minneapolis, MN (US)

(73) Assignee: Sunfish Studio, LLC, Minneapolis, MN (US)

(*) Notice: Subject to any disclaimer, the term of this patent is extended or adjusted under 35 U.S.C. 154(b) by 1644 days.

(21) Appl. No.: 12/161,826

(22) PCT Filed: Feb. 14, 2007

(86) PCT No.: PCT/US2007/062142
§ 371 (c)(1),
(2), (4) Date: Aug. 23, 2010

(87) PCT Pub. No.: WO2007/098349
PCT Pub. Date: Aug. 30, 2007

(65) Prior Publication Data
US 2011/0043532 A1    Feb. 24, 2011

Related U.S. Application Data

(60) Provisional application No. 60/774,817, filed on Feb. 17, 2006.

(51) Int. Cl.
| | | |
|---|---|---|
| G06T 15/30 | (2011.01) | |
| G06T 17/20 | (2006.01) | |
| G09G 5/00 | (2006.01) | |
| G06K 9/62 | (2006.01) | |
| G06K 9/34 | (2006.01) | |
| G06F 7/499 | (2006.01) | |

(52) U.S. Cl.
CPC .................................. G06F 7/49989 (2013.01)
USPC ........... 345/581; 345/423; 345/643; 345/645; 382/155; 382/160; 382/173; 382/180; 382/224

(58) Field of Classification Search
CPC ................ G09G 5/395; G06F 3/04842; G06F 17/30265; G06T 7/0079; G06T 7/2006; G06K 9/6228
USPC .................. 345/423, 643, 645; 382/155, 160, 382/173–180, 224–226
See application file for complete search history.

(56) References Cited

U.S. PATENT DOCUMENTS

| | | | |
|---|---|---|---|
| 6,873,962 B1* | 3/2005 | Doner .......................... | 705/7.22 |
| 7,050,068 B1* | 5/2006 | Bastos et al. .................. | 345/613 |
| 2004/0217956 A1* | 11/2004 | Besl et al. ..................... | 345/419 |

OTHER PUBLICATIONS

Gat, A Branch-and-Bound Technique for Nano-Structure Image Segmentation, Jun. 22, 2003, CVPRW '03, vol. 2, pp. 1-6.*
Zilinskas et al., Evaluation Ranges of Functions using Balanced Random Interval Arithmetic, Jun. 2003, Informatica 2003, vol. 14, No. 3, pp. 403-416.*

* cited by examiner

*Primary Examiner* — Xiao Wu
*Assistant Examiner* — Matthew D Salvucci
(74) *Attorney, Agent, or Firm* — Nawrocki, Rooney & Sivertson, P.A.

(57) ABSTRACT

An improved branch-and-bound process of interval arithmetic subdivision in furtherance of computation of rigorous error bounds on integrated digital scene information for two dimensional display is provided. More particularly, a first aspect of the subject process includes pseudo-randomly subdividing an interval domain comprising a set of interval variables in furtherance of ascertaining a characteristic contribution of the interval variables of said set of interval variables to an image space comprising at least a sub-pixel area. A further aspect, either alone or in combination with the first aspect contemplates pseudo-randomly discarding a select partitioning of interval variables of a set of interval variables of a geometric function from a computed solution of an interval arithmetic branch-and-bound process.

1 Claim, 23 Drawing Sheets

PSEUDO-RANDOM BISECTION

MIDPOINT BISECTION
(PRIOR ART)
$r = 0$ 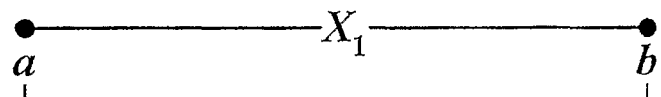
$r = 1$ 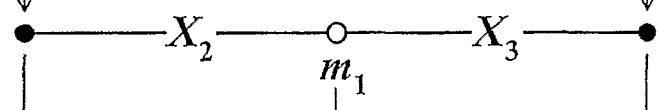
$r = 2$ 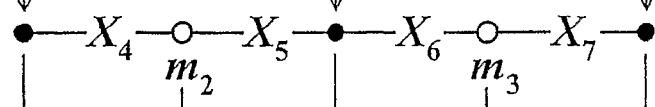
$r = 3$ 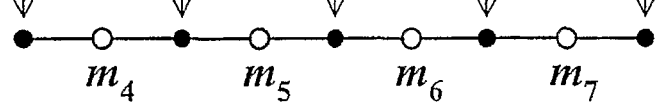
FIG. 1

INTERVAL ARITHMETIC:
SAMPLING $f(x)$ WITH MIDPOINT BISECTION
(PRIOR ART)

INTERVAL ARITHMETIC:
SAMPLING *f(x)* WITH MIDPOINT BISECTION
(PRIOR ART)

INTERVAL ARITHMETIC:
SAMPLING $f(x)$ WITH MIDPOINT BISECTION
(PRIOR ART)

ROBUST VISIBLE SURFACE DETERMINATION USING INTERVAL ANALYSIS
(PRIOR ART)

MIDPOINT METHOD:
BISECTION OF $P(u,v)$ PARAMETER DOMAIN
(PRIOR ART)

MIDPOINT METHOD:
BISECTION OF P(u,v) PARAMETER DOMAIN
(PRIOR ART)

INTERVAL ARITHMETIC:
SAMPLING $f(x)$ WITH PSEUDO-RANDOM BISECTION
(PRESENT INVENTION)

PSEUDO-RANDOM METHOD:
BISECTION OF $P(u,v)$ PARAMETER DOMAIN
(PRESENT INVENTION)

REGULAR UNDERSAMPLING:
BISECTION OF $Q(u,v,t)$ PARAMETER DOMAIN
(PRESENT INVENTION)

REGULAR UNDERSAMPLING:
BISECTION OF $Q(u,v,t)$ PARAMETER DOMAIN
(PRESENT INVENTION)

"RANDOM WALK" UNDERSAMPLING:
BISECTION OF $Q(u,v,t)$ PARAMETER DOMAIN
(PRESENT INVENTION)

"RANDOM WALK" UNDERSAMPLING
COMBINED WITH PSEUDO-RANDOM BISECTION
(PRESENT INVENTION)

"RANDOM WALK" UNDERSAMPLING
COMBINED WITH PSEUDO-RANDOM BISECTION
(PRESENT INVENTION)

PSEUDO-RANDOM INTERVAL ARITHMETIC SAMPLING TECHNIQUES IN COMPUTER GRAPHICS

This is an international patent application filed under 35 U.S.C. §363 claiming priority under 35 U.S.C. §119(e)(1) of U.S. provisional patent application Ser. No. 60/774,817 entitled "System for, and Method of, Pseudo-Random Interval Sampling Techniques in Computer Graphics" filed Feb. 17, 2006 and incorporated herein by reference in its entirety.

TECHNICAL FIELD

The present invention advantageously relates to computer imaging or graphics, more particularly, to photorealistic image synthesis utilizing interval arithmetic and/or interval analysis to integrate digital scene information in furtherance of constructing and/or reconstructing an image of the digital scene, more pointedly, incorporation of pseudo-random sampling techniques in such interval based photorealistic image synthesis methods.

BACKGROUND OF THE INVENTION

The common and popular notion of interval arithmetic is based on the fundamental premise that intervals are sets of numbers, and that arithmetic operations can be performed on these sets. This interpretation of interval arithmetic was initially advanced by Ramon Moore in 1957 and has been recently promoted and developed by interval researchers such as Eldon Hansen, William Walster, Guy Steele and Luc Jaulin. This is the so-called "classical" interval arithmetic, and it is purely set-theoretical in nature.

A set-theoretical interval is a compact set of real numbers [a,b] such that a≤b. The classical interval arithmetic operations of addition, subtraction, multiplication and division combine two interval operands to produce an interval result such that every arithmetical combination of numbers belonging to the operands is contained in the interval result. This leads to programming formulae made famous by classical interval analysis which are discussed at length in the interval literature.

In 2001, Miguel Sainz and other members of the SIGLA/X group at the University of Girona, Spain, introduced a new branch of interval mathematics known as "modal intervals." Unlike the classical view of an interval as a compact set of real numbers, the new modal mathematics considers an interval to be a quantified set of real numbers. A modal interval is comprised of a binary quantifier and a set-theoretical interval. Therefore, if Q is a quantifier and X' is a purely set-theoretical interval, then X=(Q, X') is a modal interval. For this reason, modal intervals are a true superset of the classical set-theoretical intervals.

Recent advances in modal interval hardware design, as described in Applicant's published application WO 2006/017996 A2 entitled "Modal Interval Processor", and further pending application serial nos. PCT/US06/38578, entitled "Reliable and Efficient Computation of Modal Interval Arithmetic Operations," and PCT/US06/38507, entitled "Computing Narrow Bounds on a Modal Interval Polynomial Function," each of which are incorporated herein by reference, provide a reliable and high-performance foundation for interval arithmetic applications.

A specific example of such an application is the field of computer graphics. In Applicant's published application WO 2006/115716 A2, entitled "System and Method of Visible Surface Determination in Computer Graphics Using Interval Analysis," incorporated herein by reference, a novel system and method of visible surface determination in computer graphics using interval arithmetic and interval analysis is provided. By abandoning traditional techniques based on point-sampling and other heuristic methods, an entirely new and robust approach is employed wherein rigorous error bounds on integrated digital scene information is computed by a recursive and deterministic branch-and-bound process of interval arithmetic subdivision. To render an image, interval arithmetic solvers capable of solving highly nonlinear systems of equations provide a robust mechanism for rendering geometry such as non-uniform rational B-splines (NURBS) and transcendental surfaces directly into anti-aliased pixels, without the need to tessellate the underlying surface into millions of tiny, pixel-sized micropolygons. As a consequence of this approach, wide intervals representing unknown parametric variables are successively contracted, resulting in a narrowing of the uncertainty of the unknown values so as to optimally "match" their contribution to the area and/or intensity of a pixel and/or sub-pixel area before being input to an interval shading function in furtherance of assigning a quality or character to a pixel.

As depicted on the cover of the book "Applied Interval Analysis," Luc Jaulin, et. al., Springer Verlag, 2001, which is incorporated herein by reference, the established method of performing a branch-and-bound interval analysis is to split the "problem" or parameter domain into a regular paving, that is, a set of non-overlapping interval boxes. At each subdivision stage, the interval is bisected at the midpoint to produce two smaller intervals of equal width. As the present invention will demonstrate, this is not always the ideal approach. In many applications of interval analysis, splitting at the midpoint introduces a constant bounded error which produces undesirable results.

Another problem of current branch-and-bound interval analysis methods is the well-known "curse of dimensionality," i.e., an exponential increase in computation time. This is a consequence of the "divide and conquer" nature of interval analysis in which interval arithmetic calculations are performed over interval domains which are recursively split into smaller and smaller sub-domains until termination criteria is reached, or proof of containment is ascertained. In the prior art, heuristic point-sampling methods such as Monte Carlo and stochastic undersampling are used when the number of dimensions is high and the problem to be solved is difficult. A classical example can be found in the paper "Spectrally Optimal Sampling for Distribution Ray Tracing," Mitchell, Don, Computer Graphics 25.4, 1991, which is incorporated herein by reference. The result is a significant reduction in computation time. Similarly, undersampling appears to offer interval analysis a tantalizing solution to the "curse of dimensionality" problem, but a method for doing this in a robust manner seems unclear and not obvious. It begs an answer to the question: is it even possible to undersample a solution when robust interval analysis methods are used?

SUMMARY OF THE INVENTION

The prior art contains little or no serious treatment of the use of randomness in interval computations. This may be due to the fact that, at face value, it appears to be a contradiction; i.e., the purpose of interval analysis is to compute rigorous and reliable error bounded results. So perhaps the idea of introducing randomness into interval computations seems a bit absurd. As it turns out, it is more than not absurd. It is absolutely essential to achieving good and proper results for certain types of interval computations, and the present invention describes how and why.

An improved branch-and-bound process of interval arithmetic subdivision in furtherance of computation of rigorous error bounds on integrated digital scene information for two dimensional display is provided. More particularly, a first, or single aspect of the subject process includes pseudo-randomly subdividing an interval domain comprising a set of interval variables in furtherance of ascertaining a characteristic contribution of the interval variables of said set of interval variables to an image space comprising at least a sub-pixel area. Advantageously, the pseudo-random subdivision of the interval domain includes a pseudo-random bisection thereof. Alternately, the pseudo-random bisection of the interval domain includes a non-midpoint bisection thereof. Further still, and advantageously, the pseudo-random subdivision of the interval domain includes bisection at a pseudo-random location within the interval domain. Finally, it is further contemplated that the pseudo-random subdivision results in a partitioning of the interval domain into a plurality of irregular intervals.

This novel method varies the constant bounded error which normally appears in an interval analysis calculation as a consequence of interval bisection methods which split an interval at the midpoint. As a result, the constant bounded error is effectively turned into bounded noise. For many types of interval analysis applications, the conversion of constant bounded error into bounded noise is an ideal solution. In the cases where this is true, the present invention produces superior results.

A further aspect of the subject process includes providing a geometric function relating a set of interval variables to an image space comprising a pixel domain; partitioning the pixel domain into a select subset so as to delimit a correlation pattern; and, discarding a select partitioning of interval variables of the set of interval variables of the geometric function from a computed solution of the interval arithmetic branch-and-bound subdivision. Advantageously, the correlation pattern comprises a true interval subset of the pixel domain, with the true interval subset associating a quantized interval of interval variables of the set of interval variables with an element of the subset. Further still, only the true interval subset of the correlation pattern is convolved with a weighting function in furtherance of the integration of said digital scene information.

In the context of pseudo-randomness, the contemplated undersampling thwarts the "curse of dimensionality," while at the same time a guaranteed interval computation is maintained. This ideal combination of features has many useful applications to fields such as computer graphics and signal processing. A detailed, exemplary, non-limiting disclosure of an application to computer graphics will be subsequently given vis-á-vis the detailed description.

In as much as the previously described aspects of the present invention are independent, they nonetheless are also strongly mutual and complimentary, e.g., an embodiment may advantageously combine pseudo-random interval bisection with interval analysis undersampling, thereby providing an "ultimate" system and method which comprises the features and benefits of both. As will be shown, this is particularly true in the context of computer graphics, wherein a preferred embodiment will most advantageously combine both aspects of the present invention.

Additional items, advantages and features of the various aspects of the present invention will become apparent from the description of its preferred embodiments, which description should be taken in conjunction with the accompanying drawings.

BRIEF DESCRIPTION OF THE DRAWINGS

FIG. 1 depicts a prior art interval domain midpoint bisection method;

FIGS. 11-12 illustrate the pseudo-random bisection method according to the present invention in relation to a P(u,v) parameter domain;

DETAILED DESCRIPTION OF THE INVENTION

The present invention distinguishes between heuristic methods, in which the results are not guaranteed to be correct, and robust methods, in which the results are guaranteed to be correct. Generally, a variety of pseudo-random interval arithmetic sampling techniques are provided. As will be more fully developed, pseudo-random or irregular actions are advantageously undertaken in the context of: interval domain subdivision, i.e., the "mechanics" of subdividing an interval domain comprising a set of interval variables; the "recursively" of the branch-and-bound process, i.e., the calculus of retaining/discarding a sub-domain of a pair of sub-domains or select partitioning of interval variables of a set of interval variables of a geometric function; and, combinations thereof. A discussion of pseudo-random interval bisection immediately follows, with a discussion of undersampling with interval arithmetic thereafter.

Pseudo-Random Interval Bisection

The fundamental tool of interval analysis is interval bisection. This is a consequence of the "divide and conquer" nature of interval analysis in which interval arithmetic calculations are performed over interval domains which are recursively split into smaller and smaller sub-domains until termination criteria is reached or proof of containment is ascertained.

In the prior interval arithmetic literature, little or no treatment has been given to bisection methods other than the most simple and obvious: bisection at the midpoint. To perform such bisection, existing methods first compute the midpoint of an interval which is to be bisected. Then two new intervals of equal width are created from the respective endpoint and midpoint of the original interval.

FIG. 1 shows the bisection of an interval domain [a,b] using a midpoint method for r=0.3 levels of recursion. Initially, the midpoint $m_1$ of interval $X_1$=[a,b] is computed, and $m_1$ is used to create equal-width intervals $X_2$=[a,$m_1$] and $X_3$=[$m_1$,b]. Recursion then proceeds to the next level. The midpoint $m_2$ of $X_2$ is computed, and $m_2$ is used to create equal-width intervals $X_4$[a,$m_2$] and $X_5$=[$m_2$,$m_1$]. Similarly, the midpoint $m_3$ of $X_3$ is computed, and $m_3$ is used to create equal-width intervals $X_6$=[$m_1$,$m_3$] and $X_7$=[$m_3$,b]. As can be seen in the limit, depicted by r=3, the entire interval domain [a,b] is eventually split into many tiny intervals of equal width.

The problem with this approach is that bisection of an interval domain X occurs at regular intervals. For any function f(x), this means f is likewise sampled by the interval arithmetic over intervals of regular width. When this happens, the bounded error is constant for frequencies of f that closely match the regular sampling interval. In certain applications, this can give rise to unwanted regularities in the error bound when evaluating f(x) with interval arithmetic. A discussion of a variety of functions follows, namely, those of FIGS. 2A-4B.

Figure 2A:
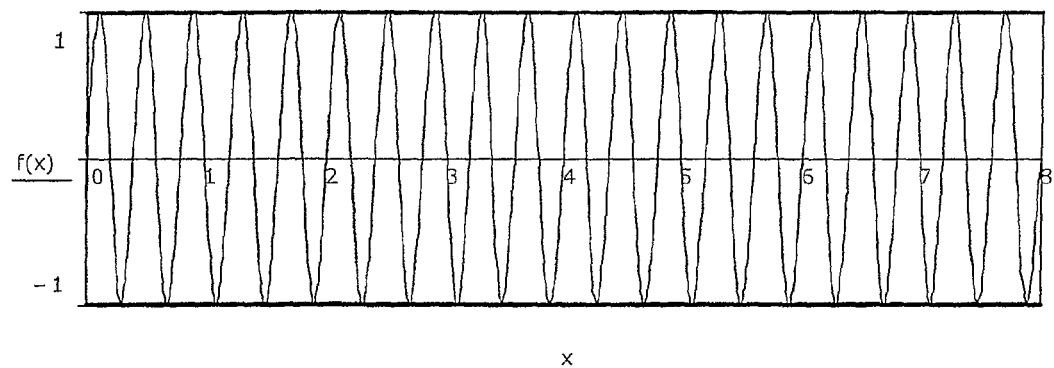
FIGS. 2A-4B each depicts heretofore known uses of interval arithmetic to sample a function f(x) using the midpoint bisection method of FIG. 1.

FIG. 2A is an f(x) comprised of frequencies which are much higher than the regular sampling intervals delimited by the integers 0-8 on the horizontal axis. In this case, the interval arithmetic consistently computes the error bound [−1,1], indicated by the bold horizontal lines, over each regular sampling interval on the horizontal axis. Because the frequencies are so high relative to the regular sampling interval, the function can shift in any direction along the horizontal axis and the interval arithmetic will still compute the error bound [−1,1]. It is precisely this ability of the interval arithmetic to bound high frequencies that is a source of dramatic anti-aliasing in Applicant's previously referenced publication on computer graphics.

Figure 2B:
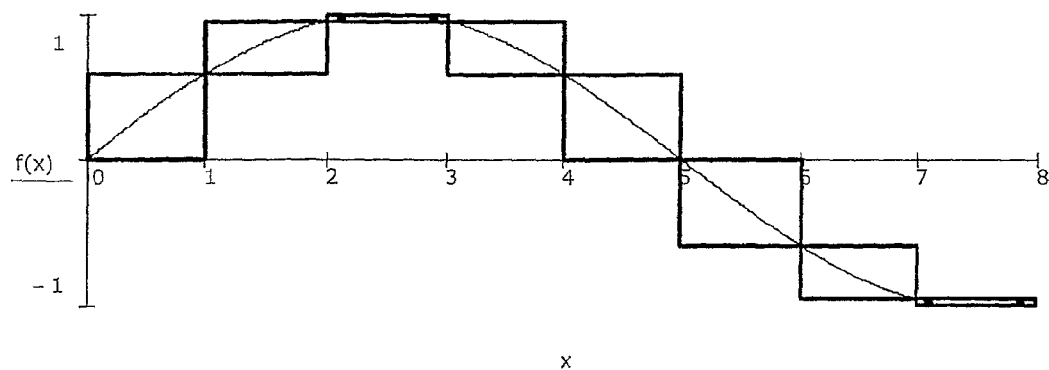

By contradistinction, FIG. 2B is an f(x) comprised of frequencies much lower than the regular sampling interval. In this case, the interval arithmetic computes narrower error bounds, indicated by the bold rectangles, over each regular sampling interval. Because the frequencies are so low relative to the regular sampling interval, the function can shift in any direction along the horizontal axis and the interval arithmetic will compute similarly narrow error bounds for the underlying function.

As has been demonstrated with reference to FIGS. 2A & 2B, sampling over intervals of regular width does not pose a problem to the interval arithmetic when the frequencies being sampled are much higher or lower than the sampling interval. As will be shown next, this is not always true for frequencies that closely match the sampling interval.

Figure 3A:
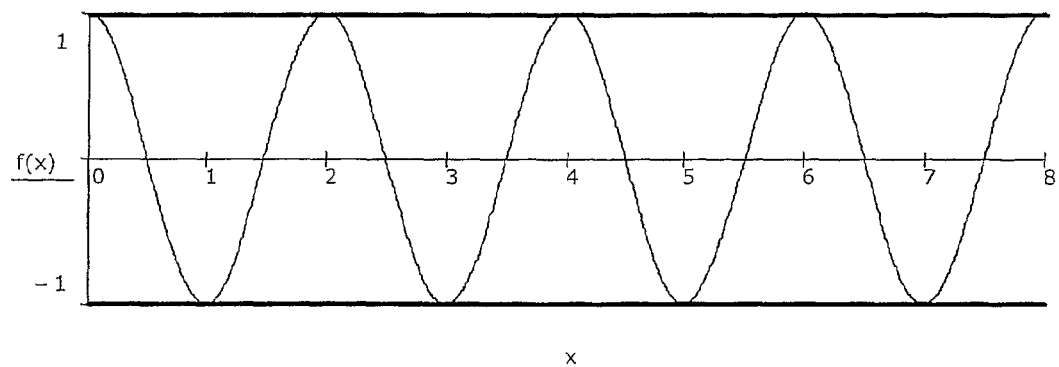
Figure 3B:
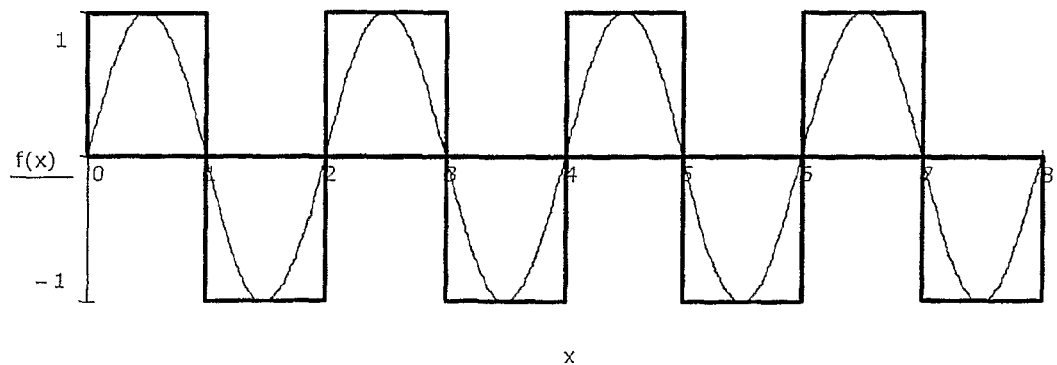
Figure 4A:
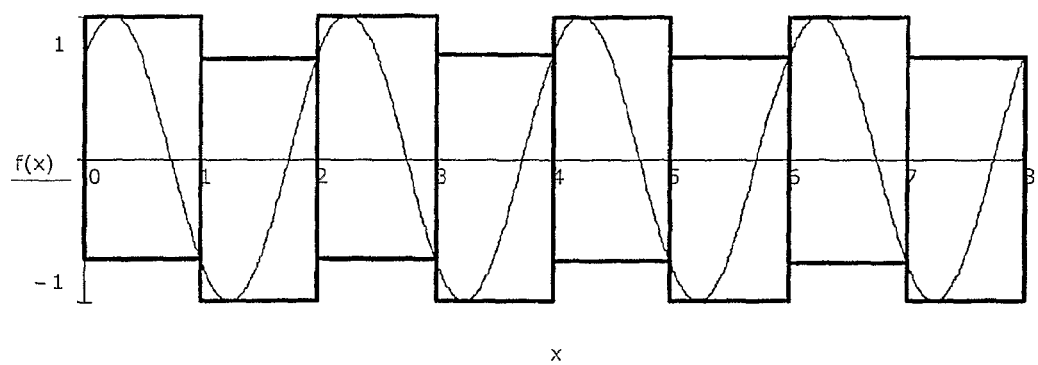
Figure 4B:
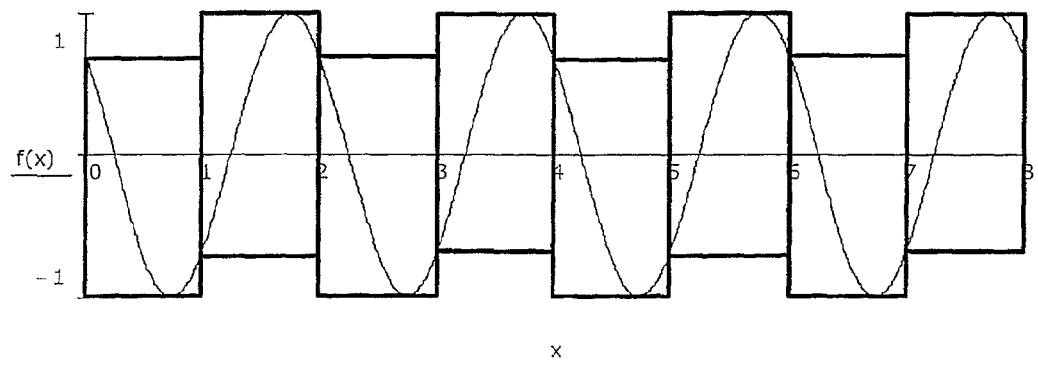

FIG. 3A is an f(x) comprised of a frequency that exactly matches the regular sampling interval. In this particular case, the interval arithmetic computes the desired error bound [−1, 1], indicated by the bold horizontal lines, over each regular sampling interval on the horizontal axis. When this same f(x) is shifted by half a frequency along the horizontal axis, however, the result is FIG. 3B. In this case, the interval arithmetic properly bounds the error, but notice the regularity which is immediately obvious by the alternating pattern of bold boxes. When the f(x) of FIG. 3A is shifted along the horizontal axis by one-fourth, or three-fourths of a frequency, as depicted, respectively, in FIGS. 4A & 4B, a similar result is revealed. Although somewhat alleviated, the regularities depicted in FIGS. 4A & 4B are still immediately obvious.

Before proceeding, it's worth emphasizing that the interval arithmetic has not failed in any of these examples. In all cases, rigorous and proper error bounds have been computed over the domain of f, i.e., the sampling is robust. However, in the cases of FIG. 3B and FIGS. 4A & 4B, the bounded error is constant. The consequence is a pattern of regularity that is immediately obvious, and, as will be shown next, is undesirable for certain applications of interval analysis.

Figure 5:
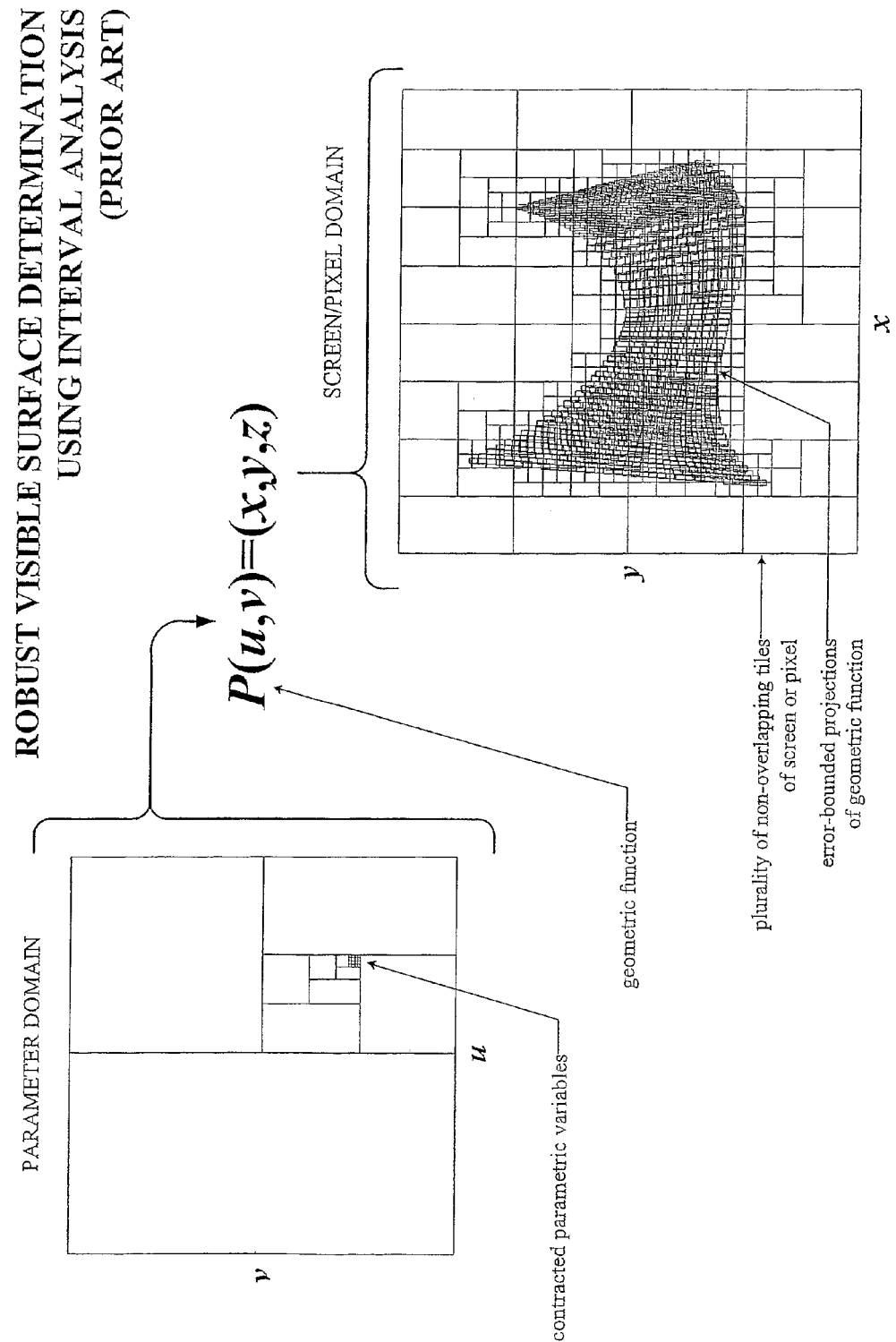
FIGS. 5-6 summarily depict Applicant's robust interval analysis method for computing a visible surface determination in computer graphics.
Figure 6:
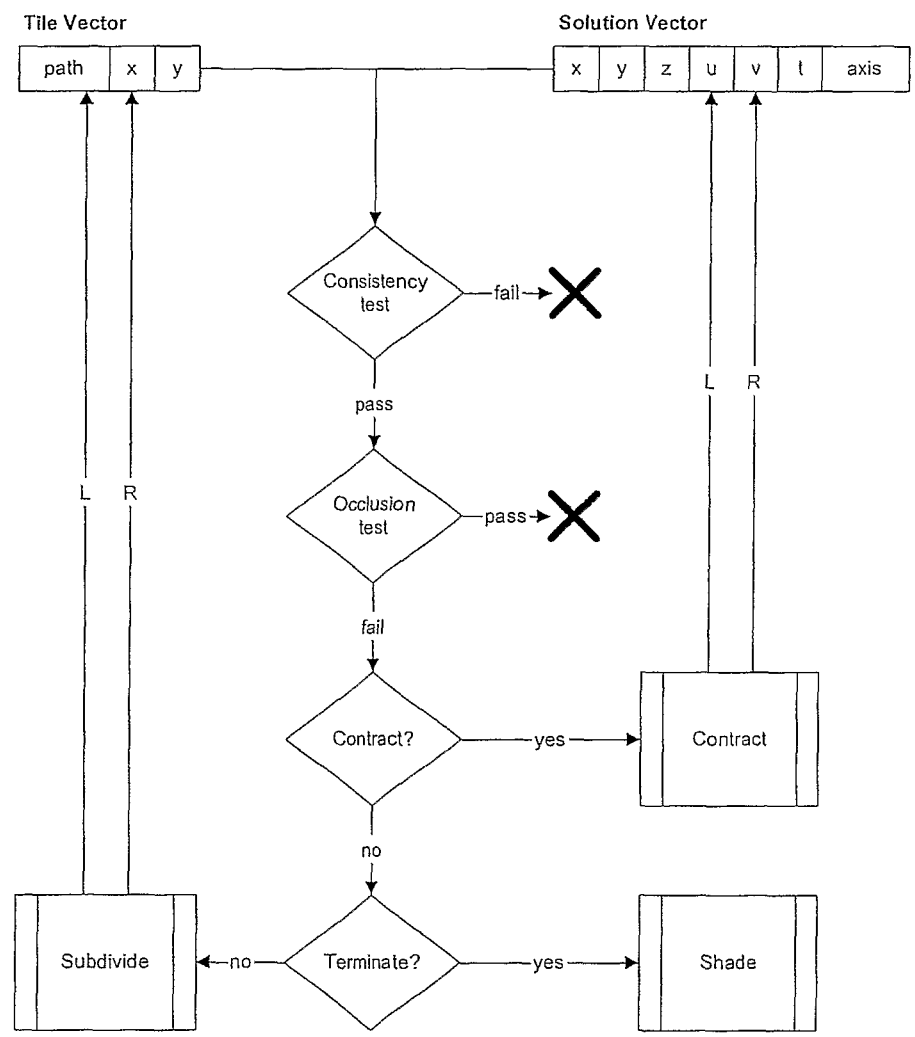

FIG. 5 is a depiction of a method described in Applicant's previously referenced publication on computer graphics. In the method, interval analysis is used to solve the general geometric function P(u,v)=(x,y,z), where u and v are parametric variables of a three-dimensional surface and P is a nonlinear function that maps the parametric variables to pixels in a computer-generated image. The unknown variables x, y, z, u and v are all intervals, and P is an interval function. To find the pixels in the image that are consistent with P, each unknown variable is initialized to an interval which spans the entire domain of interest. For example, x, y and z are initialized to bound all pixels in the image and u and v are initialized to bound the entire parametric domain of the surface. Then a branch-and-bound interval analysis, as summarized in FIG. 6, is performed over the x, y and z domains of the pixels, contracting the u and v parametric variables after each branch-and-bound iteration that occurs in the image domain. For each iteration, an error-bounded projection of P(u,v), i.e., a solution vector, is computed and checked for intersection (i.e., consistency) with the current portion of the image and/or pixel under consideration, i.e., a tile vector. If an intersection exists and the solution vector is not occluded, then further processing commences, resulting in contraction of parametric variables, subdivision of the image domain, or termination. Contraction of the parametric variables u and v can be done efficiently with midpoint bisection, e.g., FIG. 1. Subdivision of x, y and z is generally terminated at the pixel or sub-pixel level. The solved u and v variables are then, for example, input to a shading function S(u,v)=(r,g,b), which determines a contribution of red, green and blue intensities to the pixel or sub-pixel solution.

Figure 7:
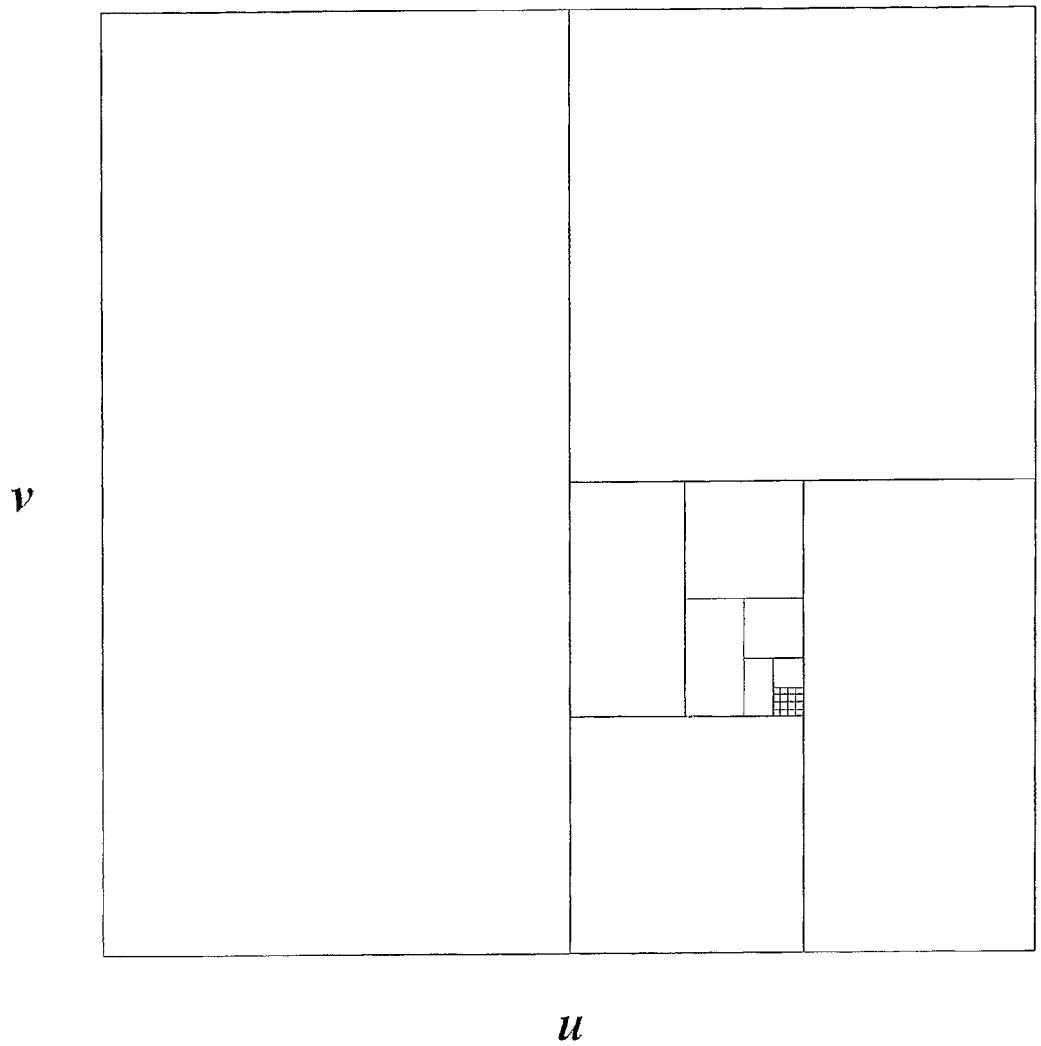
FIGS. 7-8 illustrate known midpoint bisection methods in relation to a P(u,v) parameter domain.
Figure 8:
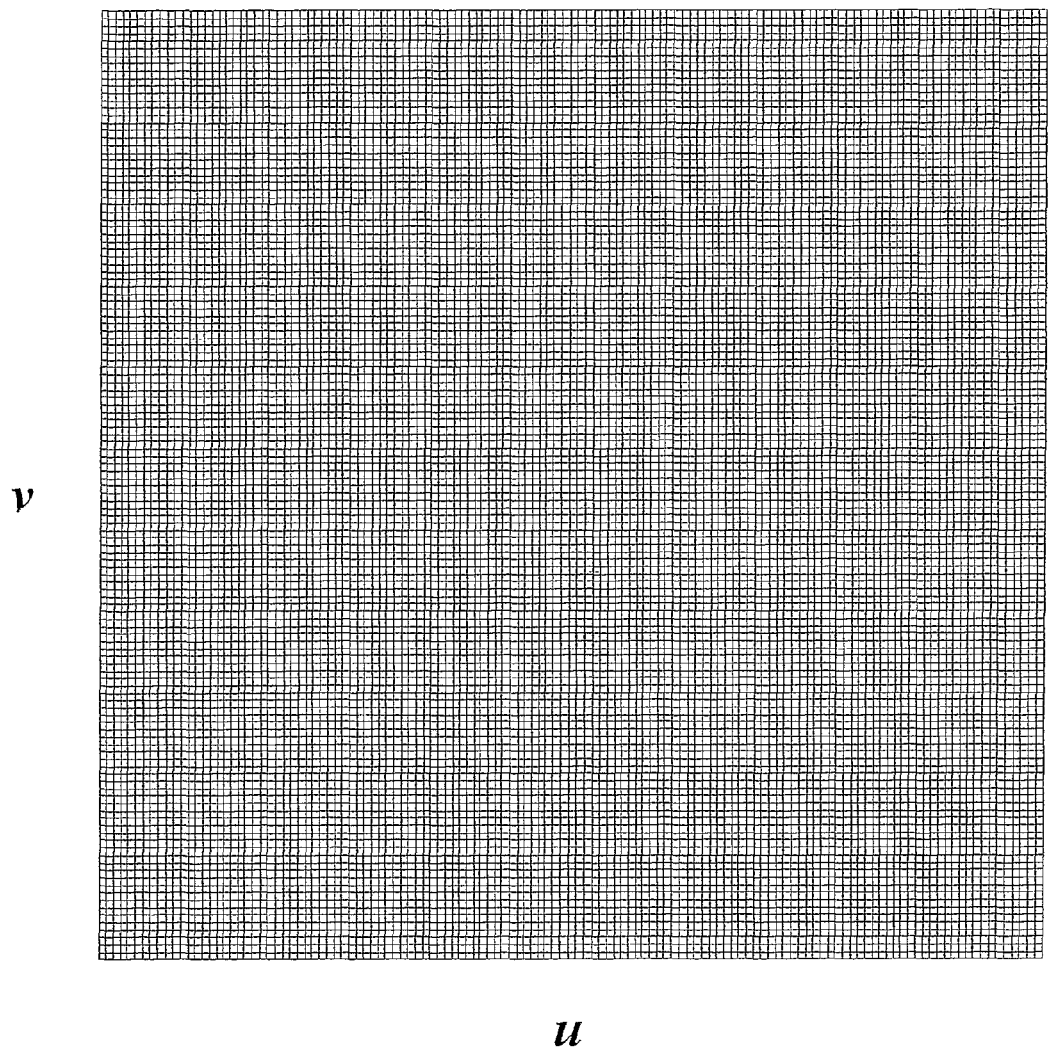

Because in FIGS. 5-6 the parametric variables u and v are always bisected at the midpoint, as depicted in FIG. 7, the sampling of the shading function S will always occur over regular intervals, as depicted in the limit by FIG. 8. In this case, and as described previously, even though the error of S(u,v) is bounded due to the interval arithmetic, e.g., the sampling of S is robust, the error is also constant for the frequencies of S that closely match the regular sampling interval. In the transitional frequencies, that is, in frequencies that are about the width of the regular sampling interval, unwanted aliases due to patterns of regularity in the constant error may still appear in the rendered image as a consequence.

To remedy this unwanted effect, the present invention uses a novel method of interval bisection: instead of bisecting about the interval midpoint, bisection occurs at a pseudo-random location within the interval. To perform such bisection, the present invention first computes a pseudo-random location within an interval which is to be bisected. Then two new intervals of different width are created from the respective endpoint and pseudo-random location of the original interval. A discussion of this aspect of the subject invention follows with regard to reference to one or more of each of FIGS. 9-12.

Figure 9:
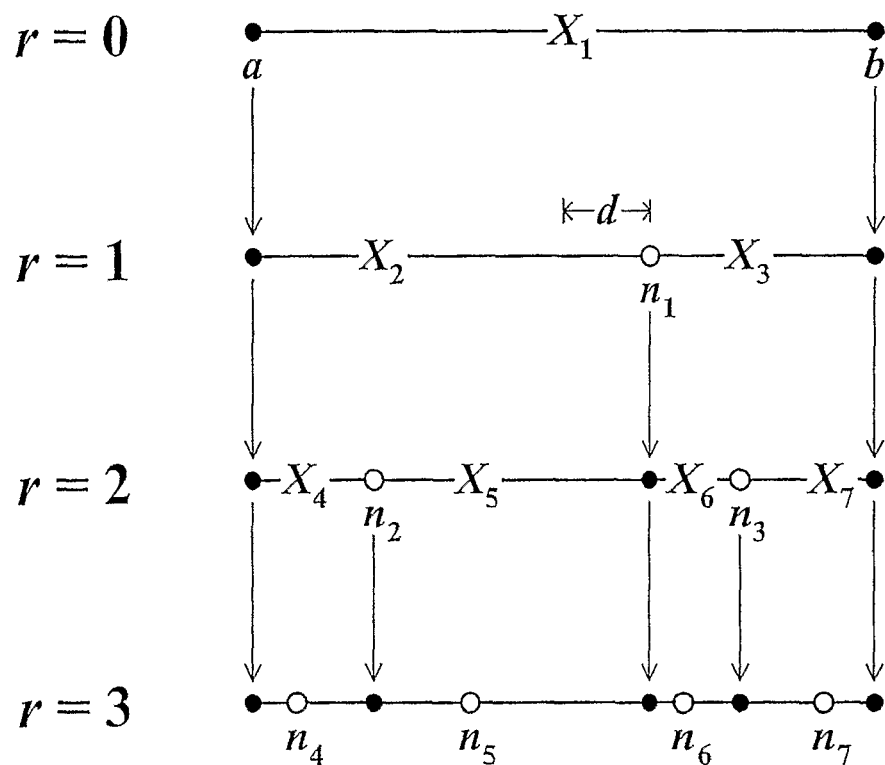
FIG. 9 depicts an interval domain pseudo-random bisection method of the present invention.

FIG. 9 shows the bisection of interval domain [a,b] using a pseudo-random method for r=0.3 levels of recursion. Initially, the pseudo-random location $n_1$ of interval $X_1$=[a,b] is computed, and $n_1$ is used to create different-width intervals $X_2$=[a,$n_1$] and $X_3$=[$n_1$,b]. Notice that, unlike midpoint bisection (FIG. 1), the pseudo-random location $n_1$ is generally some distance d from the true midpoint of $X_1$. Recursion then proceeds to the next level. The pseudo-random location $n_2$ of $X_2$ is computed, and $n_2$ is used to create different-width intervals $X_4$=[a,$n_2$] and $X_5$=[$n_2$,$n_1$]. Similarly, the pseudo-random location $n_3$ of $X_3$ is computed, and $n_3$ is used to create different-width intervals $X_6$=[$n_1$,$n_3$] and $X_7$=[$n_3$,b]. As can be seen in the limit, depicted by r=3, the entire interval domain [a,b] is eventually split into many tiny intervals of varying width.

The benefit of this approach is that bisection of an interval domain X no longer occurs at regular intervals. For any function f(x), this means f is likewise sampled by the interval arithmetic over intervals of varying width. As a consequence, the bounded error varies for frequencies of f that closely match the regular sampling interval. In many applications this is highly desirable, as it can alleviate the aliasing caused by unwanted patterns in the error bound solution when f(x) is evaluated over a regular sampling interval with the interval arithmetic (see FIG. 3B, 4A, or 4B).

Figure 10:
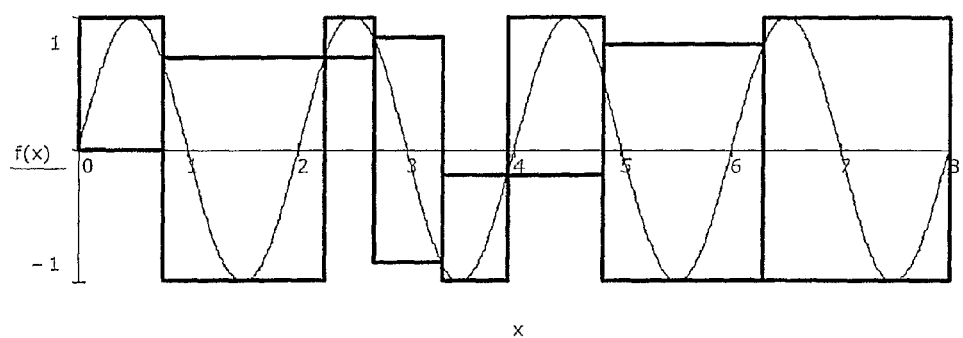
FIG. 10 depicts use of interval arithmetic to sample a function f(x) using the pseudo-random bisection method of FIG. 9.

FIG. 10 is the f(x) of FIG. 32 sampled over intervals of varying width, which have been computed by the pseudo-random bisection method of the present invention. As can be clearly seen by comparing FIG. 10 and FIG. 3B, the unwanted patterns of regularity caused by constant error are absent from the FIG. 10 representation.

The pseudo-random bisection method has no effect on frequencies which are much higher or lower than the sampling interval. For example, the f(x) in FIGS. 2A & 2B are not adversely affected in any way. In those cases the interval arithmetic continues to compute robust bounds over the sampling domains of varied width, but aliases that otherwise appear in the transitional areas where frequencies closely match the width of a regular sampling interval, e.g., FIG. 3B and FIGS. 4A & 42, are eliminated.

Figure 11:
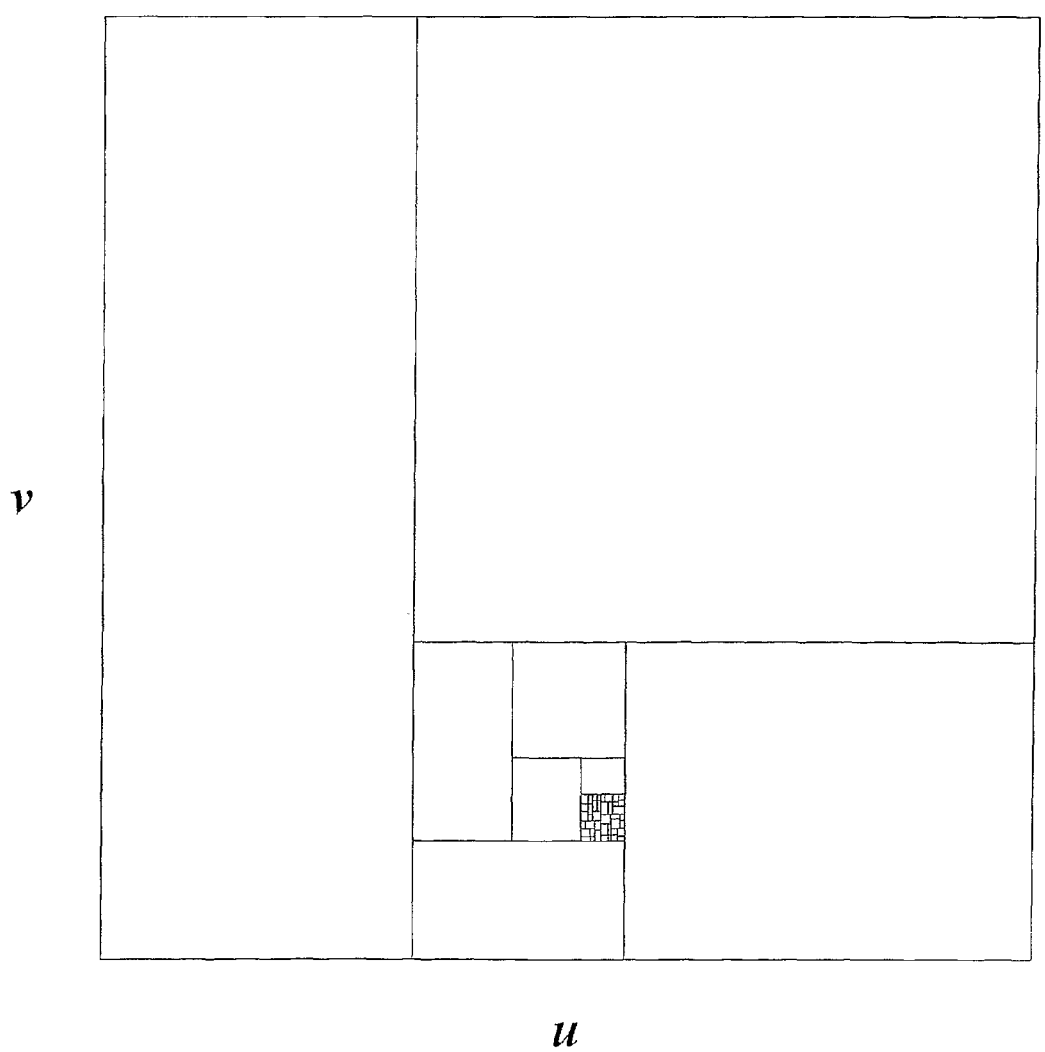

Turning again to computer graphics, pseudo-random bisection Can be used in the method of FIG. 6 when contracting the parametric variables u and v, e.g., FIG. 11. This is advantageous, because sampling of the shading function S no longer occurs over regular intervals, as depicted in the limit of FIG. 12. The irregular sampling of the shading function turns the otherwise constant bounded error into bounded noise, which removes objectionable artifacts in the reconstructed image that would otherwise appear.

Unlike common and familiar pseudo-random point-sampling techniques, which are heuristic, the pseudo-random interval bisection method is robust, e.g., it employs interval arithmetic to compute a rigorous bound for each solution in the image. As a consequence, aliases and/or noise do not "creep" into the high and low frequencies of the image, which is often a typical consequence of prior art sampling methods that do not use interval arithmetic to perform a robust sampling of the parameter domain. For these reasons, the present invention is a significant improvement over established techniques in the prior art.

Undersampling with Interval Arithmetic

As previously mentioned, the fundamental tool of interval analysis is interval bisection. This is a consequence of the "divide and conquer" nature of interval analysis in which interval arithmetic calculations are performed over interval domains which are recursively split into smaller and smaller sub-domains until termination criteria is reached or proof of containment is ascertained. The prior section dealt exclusively with the bisection of an interval at each level of recursion. In this section, the more general recursive behaviors of a branch-and-bound method are considered. Specifically, a novel application of undersampling theory is employed to produce new and improved branch-and-bound methods for an interval analysis.

Because the primary goal of interval arithmetic and interval analysis is to compute rigorous error bounds on mathematical functions, it may also seem a contradiction to use interval analysis to undersample a mathematical function. The purpose of undersampling, after all, is to selectively sample only a subset of an available parameter space. This appears to be in conflict with the intrinsic purpose of interval arithmetic and interval analysis, which is to compute rigorous error bounds over the entire domain of an available parameter space. It begs a question, is it even possible to undersample a function using interval analysis?

This apparent contradiction and dilemma is not justified, however, if a selectively-chosen subset of a parameter space is simply treated as the entire input domain for a robust interval analysis. In other words, rigorous error bounds can be computed over a selectively-chosen subset of an available parameter space. From this perspective, the problem simply reduces to finding a method which can choose an appropriate subset of an available parameter space. In turn, the subset is then sampled by interval arithmetic and/or interval analysis.

Figure 13:
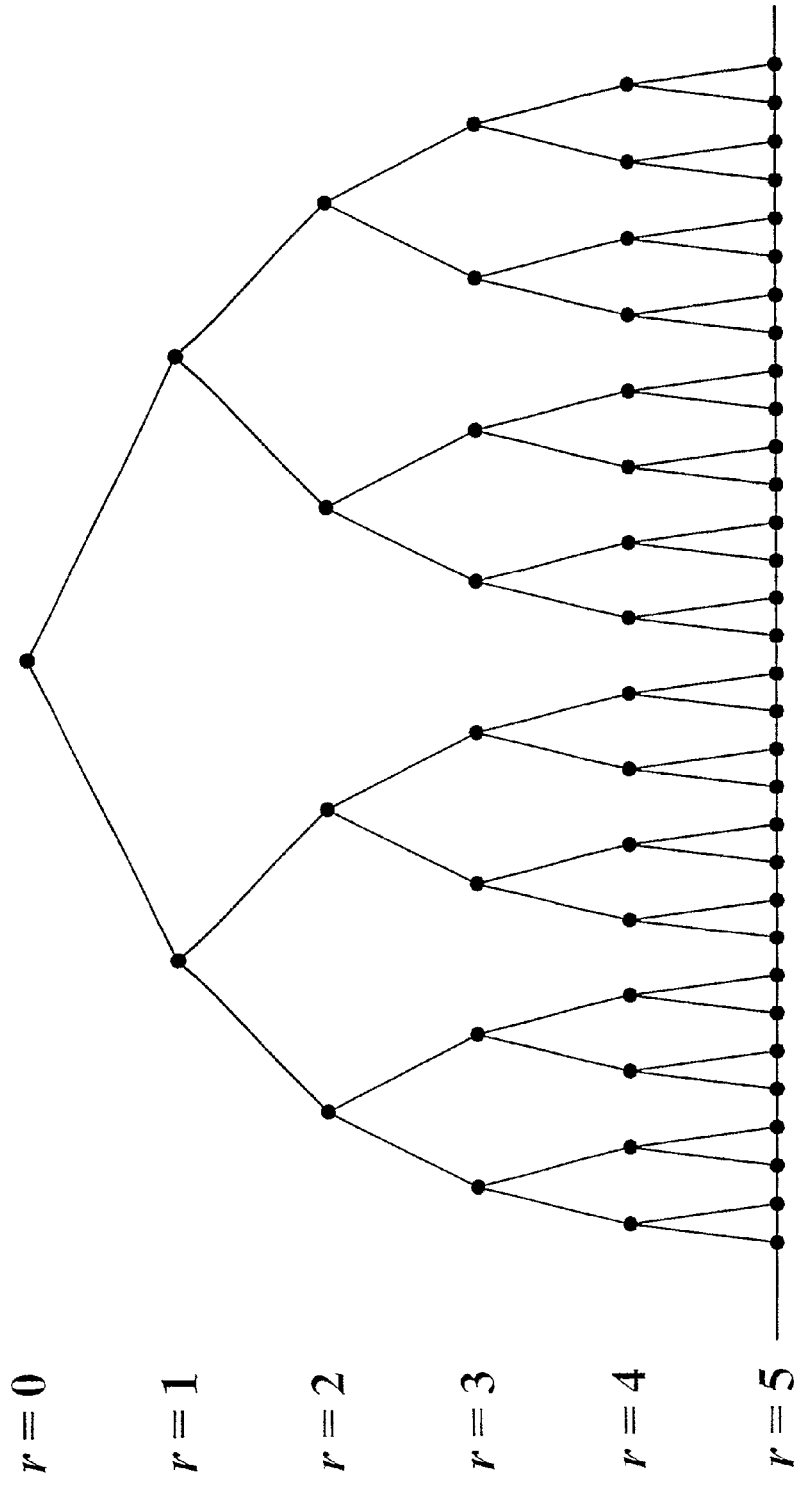
FIG. 13 depicts the behavior of a known interval branch-and-bound method.

FIG. 13 generally depicts the behavior of a typical branch-and-bound interval bisection method for r=0.5 levels of recursion. Each node, i.e., each black dot, represents a particular execution state, and each level of recursion corresponds to a bisection of a domain interval, as depicted in FIG. 1. The fact that the overall behavior of the branch-and-bound method can be viewed graphically as a binary tree is a consequence of the interval bisection, that is, each recursive level of bisection produces two sub-intervals, as, for example, in FIG. 1, $X_1$ is bisected into sub-intervals $X_2$ and $X_3$.

In any and all such branch-and-bound methods, recursion stops when termination criteria, or proof of containment, are ascertained. Such termination criteria and containment proofs are well known in the art. The termination criteria are depicted in FIG. 13 by the horizontal line at r=5. Contrary to most real-world implementations, most termination criteria almost never occur always at the same recursion level. Additionally, missing branches in the tree due to proof of containment are also not represented, i.e., a real-world implementation avoids recursion into branches of the tree when the interval arithmetic can prove that the bounded interval domain of a particular execution state no longer contributes to the solution. For all of these reasons, it should be obvious that FIG. 13 is understood to be a simplification of a real-world branch-and-bound system and/or method. The simplification is made so as not to obscure the inventive steps of this aspect of the present invention, but it should be obvious that such a simplification is not a limiting factor to the present invention.

Returning to computer graphics, the general geometric function Q(u,v,t)=(x,y,z) can describe a three-dimensional surface animated over time. In this case, the variables u and v are intrinsic parameters of the surface while t controls the parameterization of the surface over time. As before, the x, y and z variables represent an image domain and Q is any general nonlinear function which maps the parametric variables into pixels within the image. The function Q is similar to the function P as previously discussed, and Q can be solved using the same methods, e.g., the methods previously summarized by FIGS. 5-6 and detailed in Applicant's previously cited work. The primary difference is that the parameter space of Q includes an extra dimension, namely, time.

In this context, the extra dimension of time translates directly into an exponential increase in the number of interval bisections which occur. More generally, this problem is known as "the curse of dimensionality," and it is well-known in the interval literature. Conceptually, the extra interval bisections are a consequence of a larger binary tree, as depicted in FIG. 13, i.e., the larger binary tree is a necessary consequence which is required to process the extra parameter dimension of Q. As can clearly be generalized, adding additional parameter variables and/or dimensions requires deeper levels of recursion into the binary tree, which can cause an exponential increase in the amount of interval bisections, and, respectively, computation time.

For computer graphics, however, an observation to be made is that much of this extra computation is unnecessary. The function Q, for example, represents a motion-blur, which is a time-averaged projection of a four-dimensional space onto a two-dimensional image plane. Fundamental to such projections, there is a loss of information due to the intrinsic nature of mapping a high-dimensional space into a much lower-dimensional space. For this reason, undersampling presents itself as a tantalizing solution to the problem, but an application of undersampling theory to robust interval analysis methods, such as those depicted in FIGS. 5-6, seems unclear, and hardly obvious.

Figure 14:
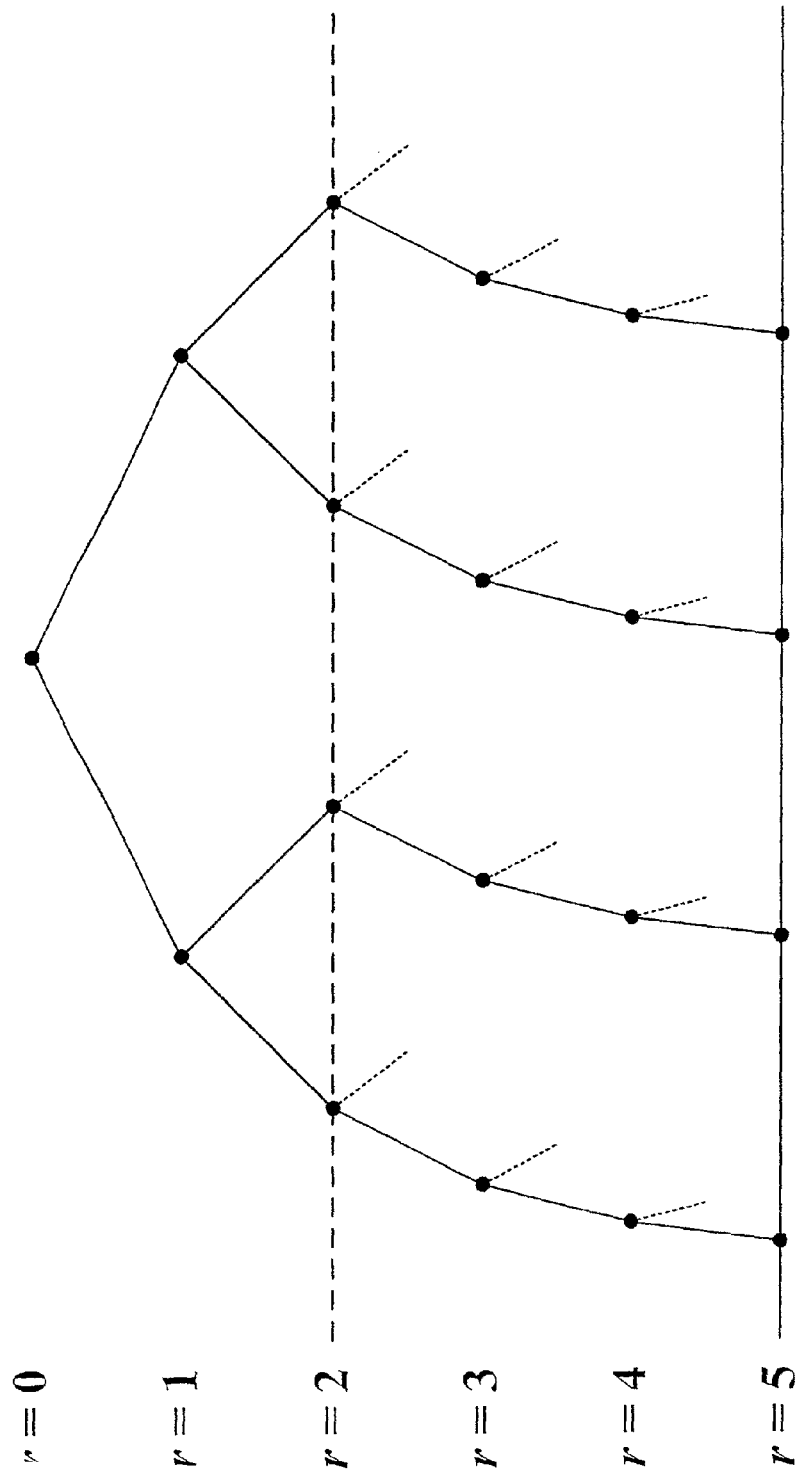
FIG. 14 depicts the behavior of a regular undersampling method according to an aspect of the present invention.

One way to undersample an interval domain is to artificially discard half of each interval, i.e., sub-domain, every time interval bisection is performed. In the context of a branch-and-bound method based on interval bisection, undersampling can begin after a specified undersampling condition is ascertained. FIG. 14 is a graphical depiction of the behavior of such a method. After an undersampling condition is met, indicated by the dashed horizontal line at r=2, each successive interval bisection artificially discards, in some sort of regular manner, a sub-interval. The result is a linear, rather than exponential, growth in the number of bisections below the undersampling condition, i.e., r=2, until termination criteria are finally ascertained, i.e., r=5. In FIG. 14, the right sub-interval of each execution state beneath the undersampling condition is artificially discarded, e.g., in FIG. 1, for example, $X_3$, $X_5$, $X_7$ and so on are discarded. It should be obvious that other regular, non-limiting methods of choosing a sub-interval to artificially discard exist.

In this way, just as a branch-and-bound method tests for a termination condition to be, ascertained; so too can it test for an undersampling condition to be met. If such a condition is reached, then undersampling is performed until termination criteria are reached. Naturally, if termination criteria are reached before the undersampling condition, no undersampling is performed. This would occur in FIG. 14, for example, if the termination and undersampling levels were exchanged, i.e., if the termination condition was at r=2 and the undersampling condition was at r=5. This is an advantageous feature of the present invention, as it allows interval solvers to offer a rigorous guarantee that undersampling will only occur if a desired condition is met, thereby allowing undersampling to take place only under precise conditions and/or in the absence of a specified termination criteria.

Figure 15:
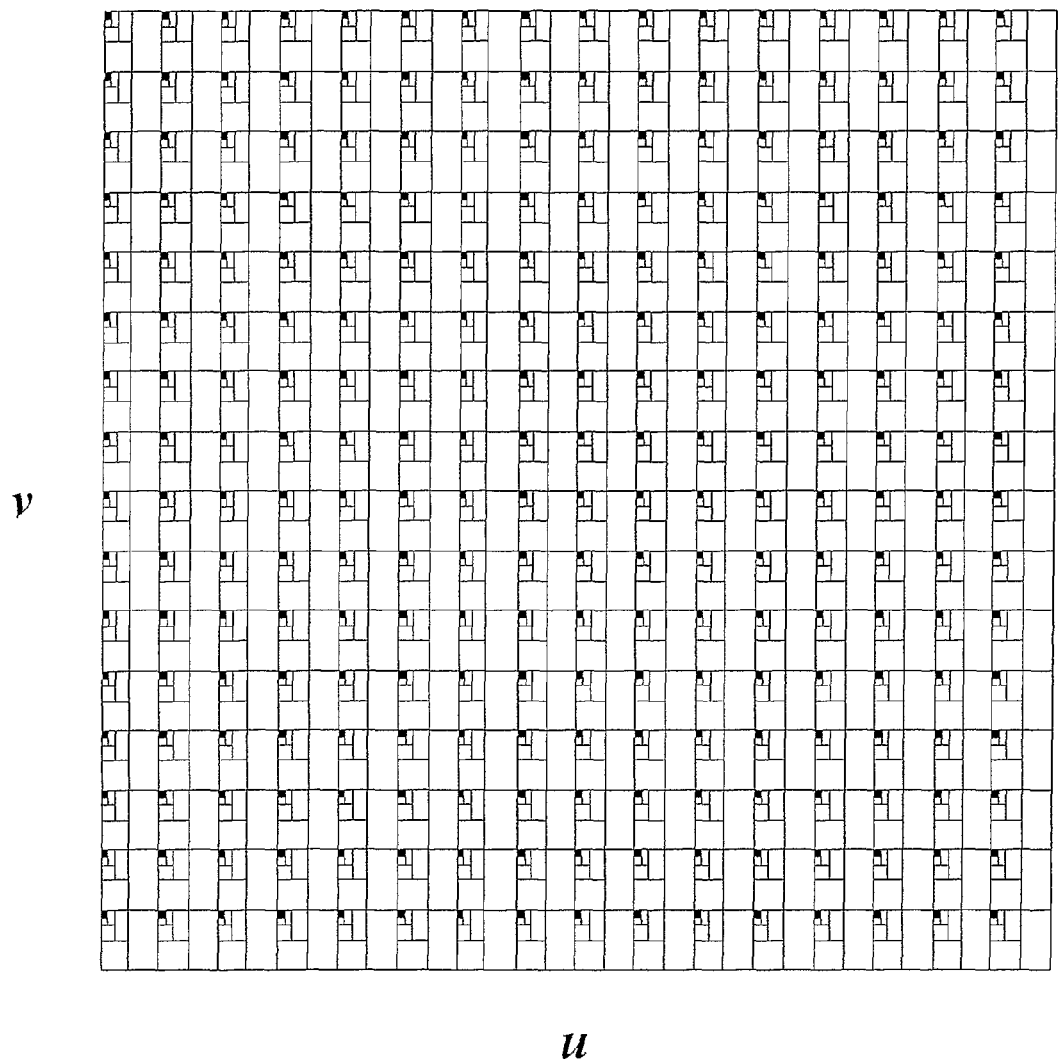
FIGS. 15-16 illustrate regular undersampling approaches in relation to a P(u,v) parameter domain according to the present invention.
Figure 16:
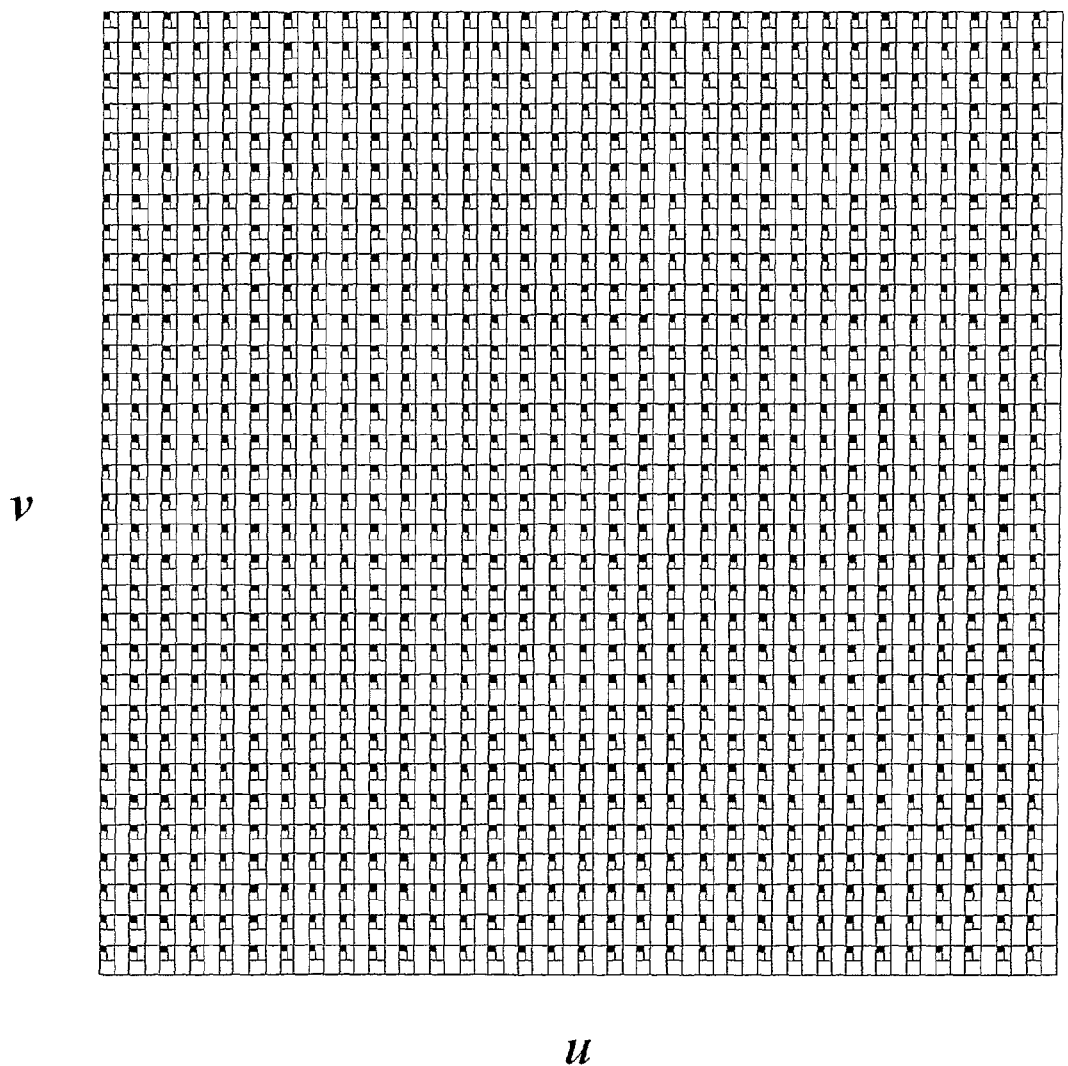

FIG. 15 is an example of using the method of FIG. 14 in conjunction with midpoint bisection, i.e., FIG. 1, to undersample the parameter domain of Q in the context of the previously discussed computer graphics rendering method. For the sake of clarity, only the u and v dimensions are represented in the figure, but the same concept applies to, and is at work in, the t dimension. The black filled-in boxes represent the subset of the (u,v,t) parameter domain accepted according to the termination condition, e.g., the black boxes represent the solved u, v and t variables which are advantageously input to, e.g., a shading function S(u,v,t)=(r,g,b), which determines a contribution of red, green and blue intensities to a time-averaged pixel or sub-pixel solution. As in FIG. 14, the undersampling and termination conditions used in FIG. 15 are simply a function of recursion level. FIG. 16 is a refinement of FIG. 15 to the extent the undersampling condition is moved down (i.e., deeper) by one level in the binary tree (see e.g., FIG. 14).

Figure 17:
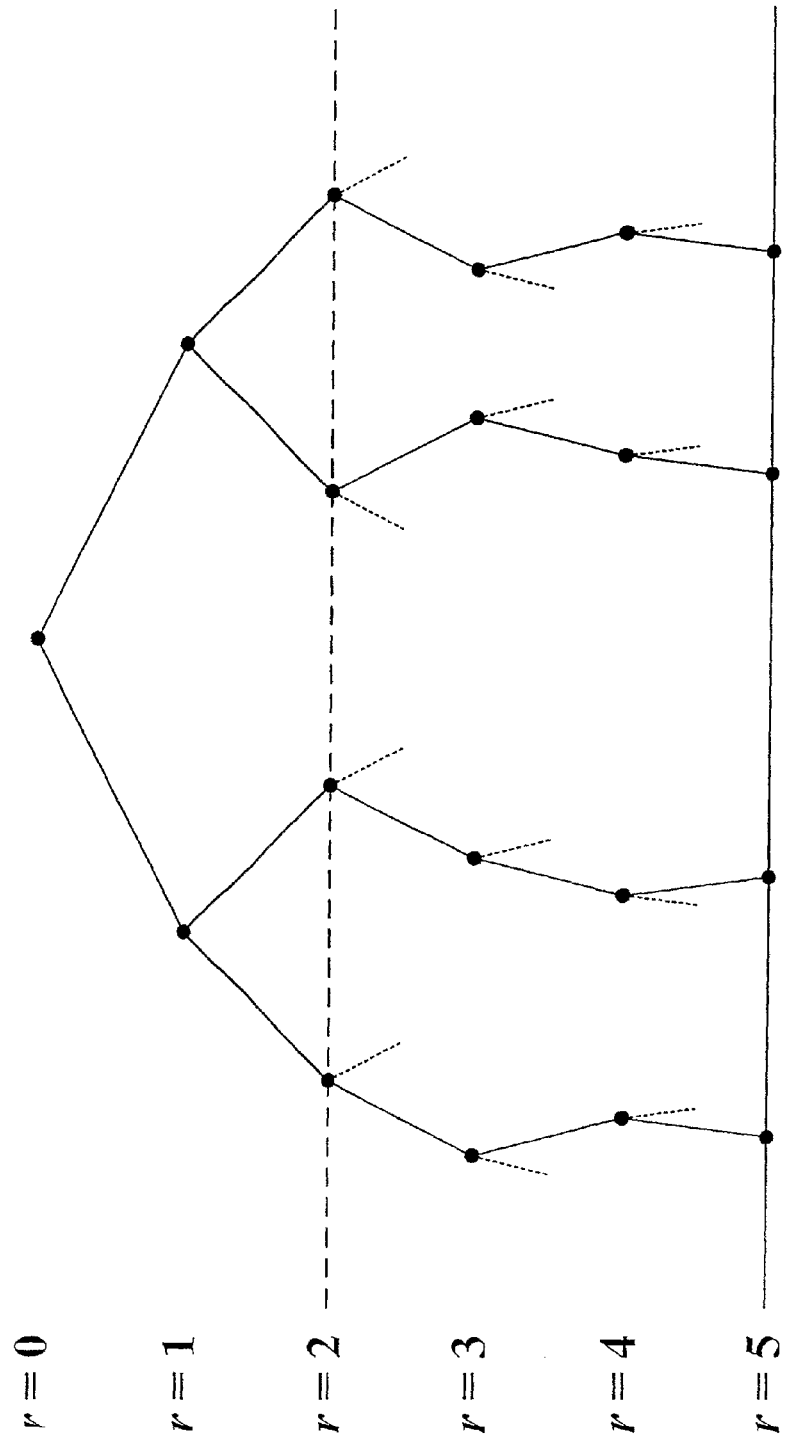
FIG. 17 depicts the behavior of a "random walk" undersampling method according to the present invention.
Figure 18:
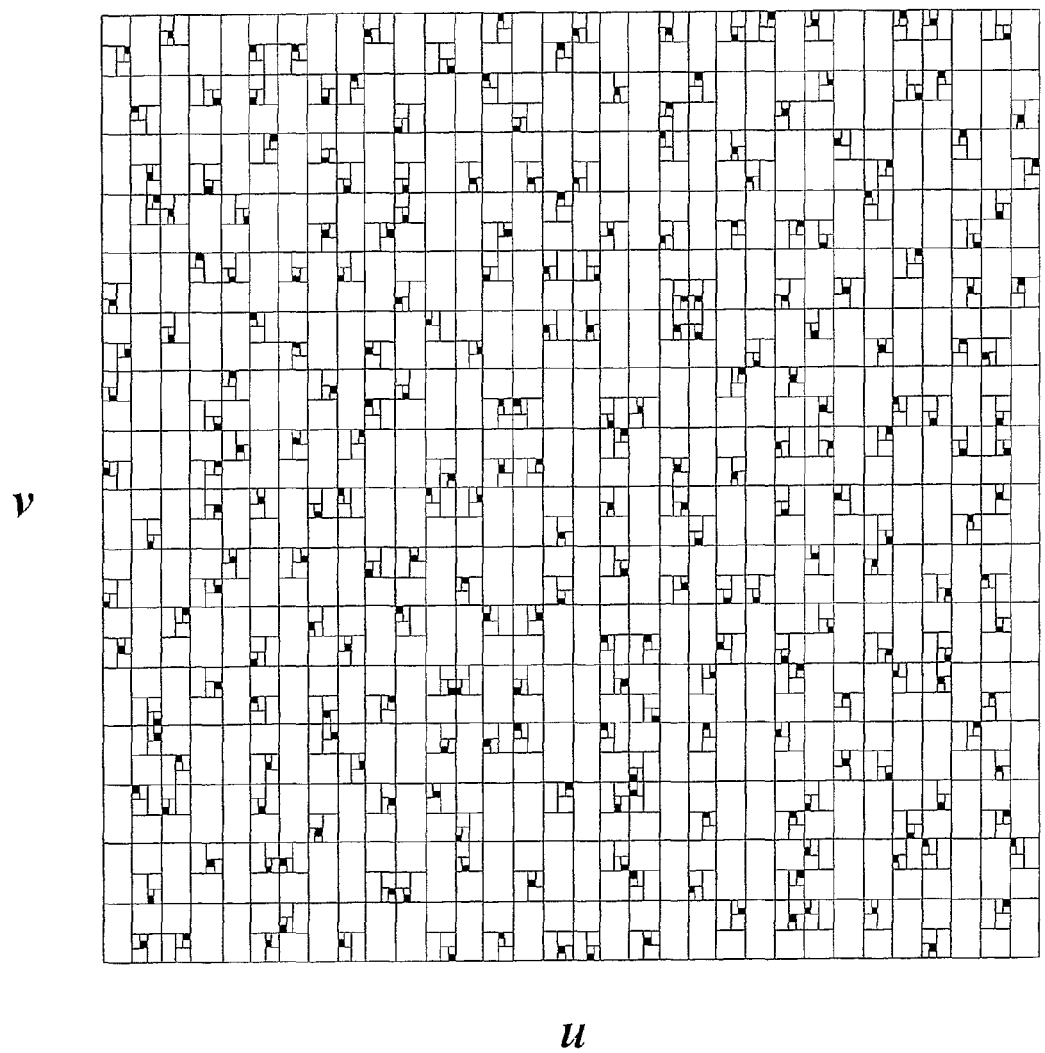
FIG. 18 illustrates a "random walk" undersampling method in relation to a Q(u,v,t) parameter domain according to the present invention.

As can be readily appreciated by looking at FIGS. 15-16, the spacing between accepted parameter solutions, which are input to the shading function S, is regular. This is due to the regularity and/or predictability of choice in which each undersampled execution state artificially discards a sub-interval. To alleviate this problem, the branch-and-bound method can instead make a pseudo-random decision for each execution state as to which interval sub-domain to discard, as depicted in FIG. 17. Conceptually, this is equivalent to a "random walk" down each branch of the binary tree beneath the undersampling condition. FIG. 17 is identical to FIG. 14 except that a pseudo-random selection, rather than a regular and/or predictable selection, is made to discard either the left or right sub-interval of each undersampled execution state. FIG. 18 shows the effect of using the pseudo-random selection process of FIG. 17 in contrast to the regular and/or predictable selection process of FIG. 14 which yields the effect of FIG. 15. Clearly, the spacing between accepted parameter solutions in FIG. 18 is no longer regular, but is instead advantageously varied.

Figure 19:
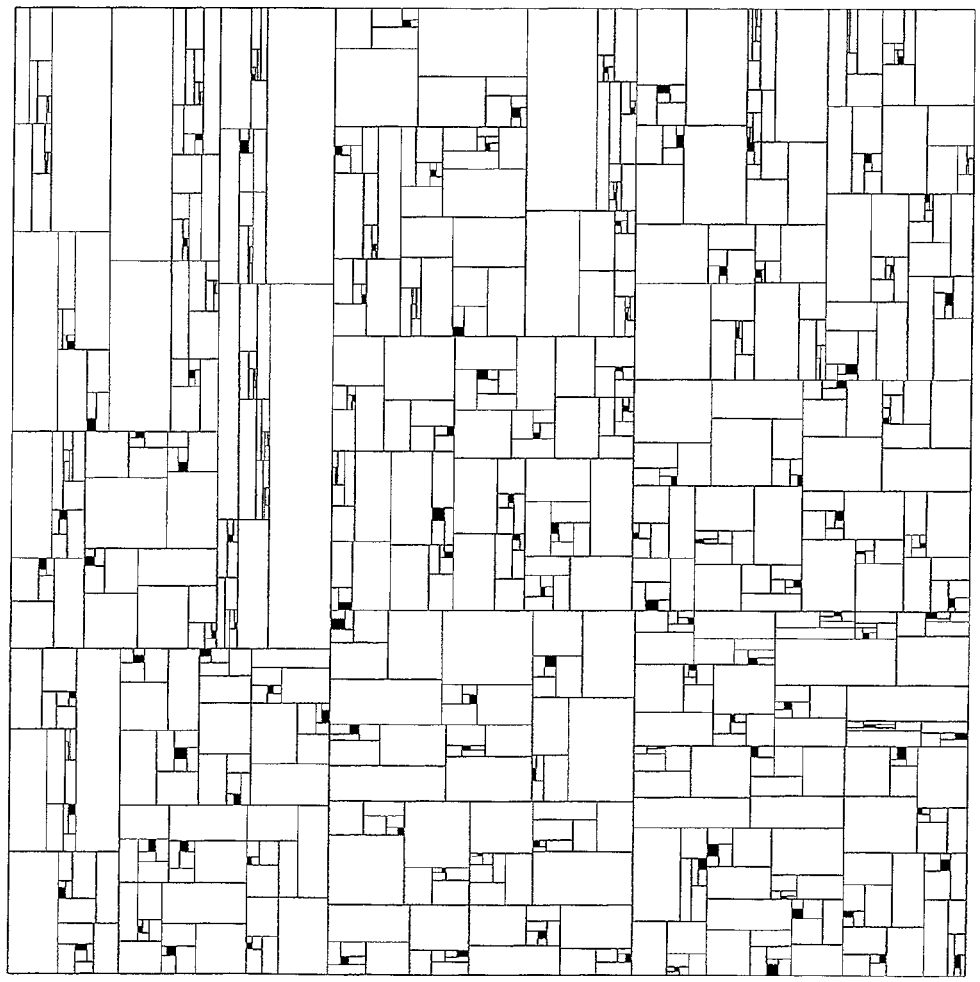
FIGS. 19-20 illustrate a combination of aspects of the subject invention, namely, a combination of "random walk" undersampling with pseudo-random interval bisection.
Figure 20:
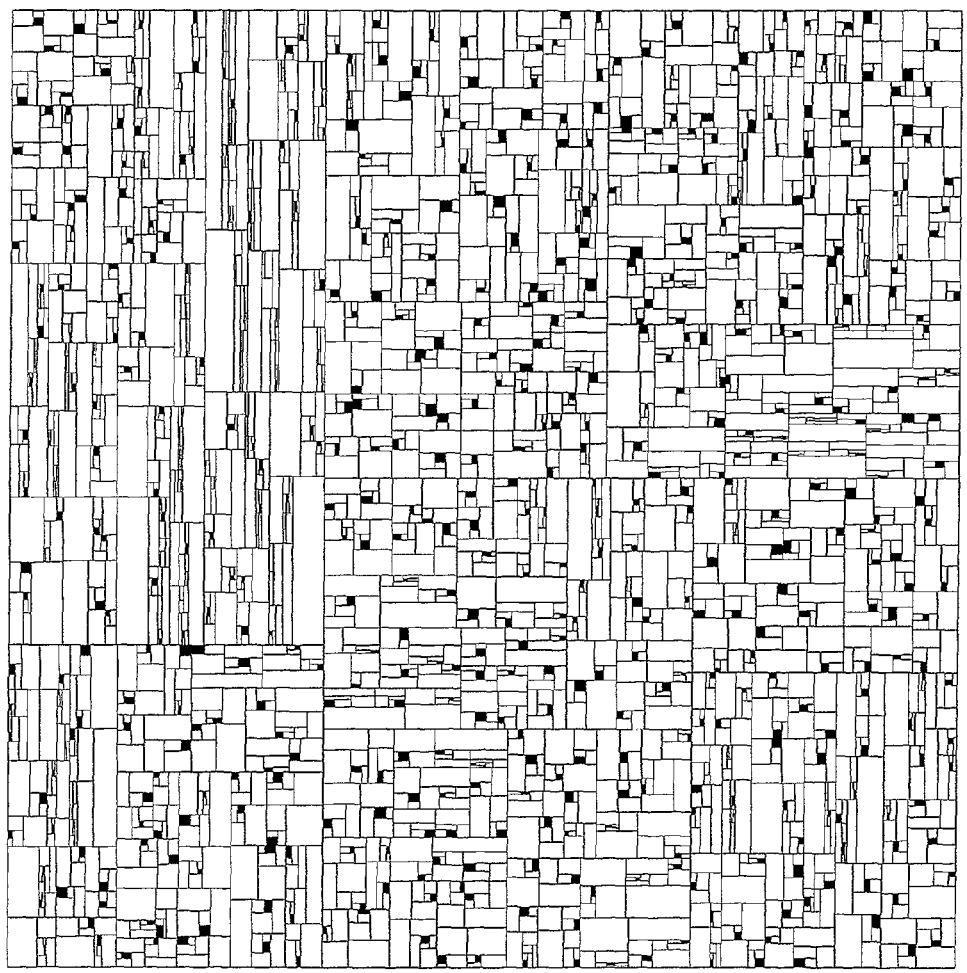

To this point, all discussion relating to FIGS. 13-18 have used bisection at the midpoint, i.e., the interval domain subdivision approach of FIG. 1. However, the prior described approaches can also be combined, i.e., advantageously combined, with the pseudo-random interval domain bisection method of FIG. 9. For example, FIG. 19 depicts the result of combining "random walk" undersampling and pseudo-random interval domain bisection, i.e., a combination of the approaches of FIGS. 17 & 9, respectively. FIG. 20 is a refinement of the undersampling condition of FIG. 19 wherein the undersampling condition is moved down (i.e., deeper) by one level in the binary tree.

A significant shortcoming of all the undersampling techniques described so far is that they are heuristic. Regardless of whether a regular and/or predictable selection process is used, or whether a pseudo-random selection process is employed, the result is the same: the selection process for undersampling is independent of a desired outcome. More specifically, it is regrettably uncorrelated to a robustly computed solution. By that reasoning, it could be said the undersampling methods presented so far are perhaps too random or arbitrary by nature. The purpose of using interval arithmetic and performing an interval analysis, after all, is to compute a robust solution. The final agenda of this section, and aspect of the present invention, is to show how the undersampling methods described so far can be made robust.

Figure 21:
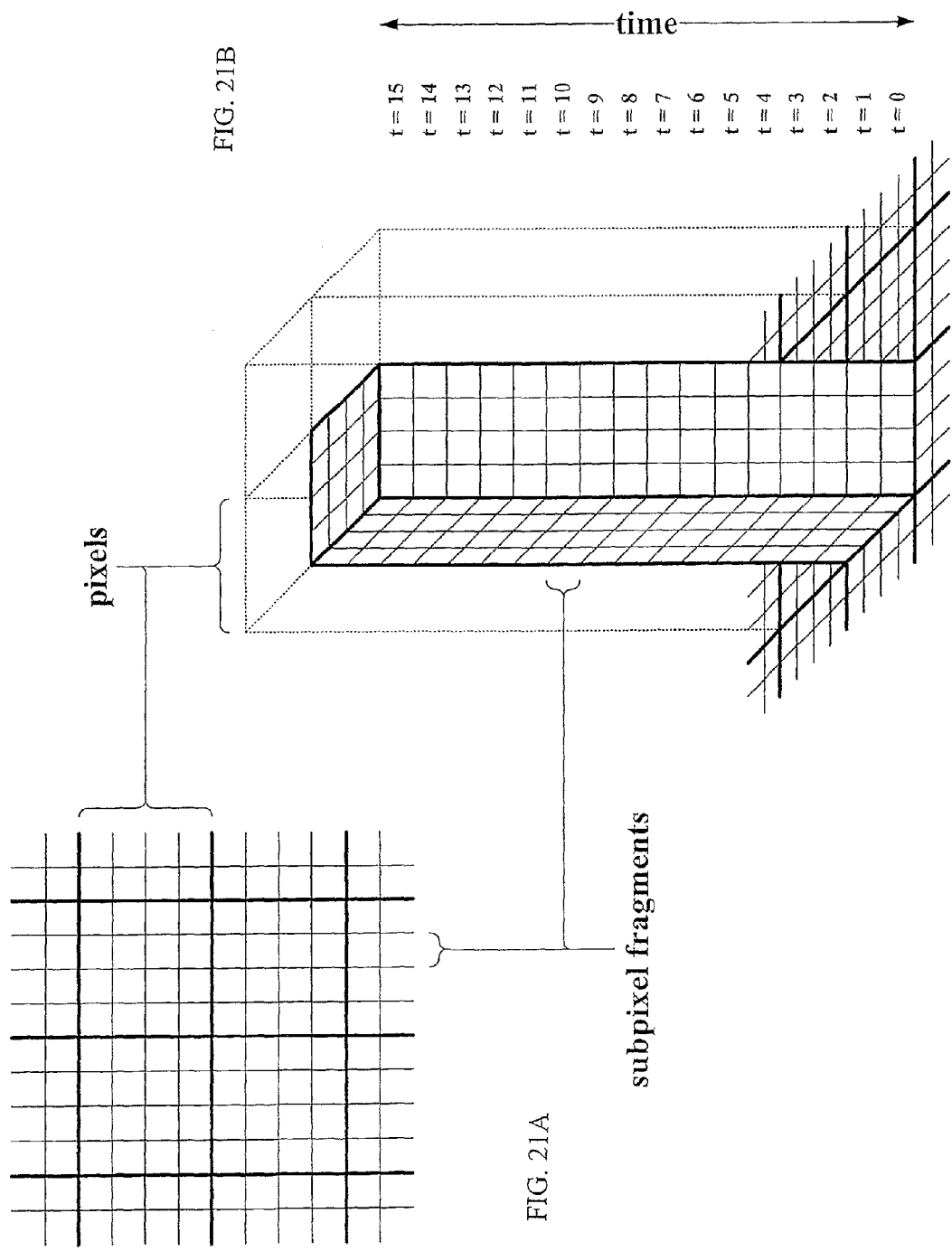
FIGS. 21A & 21B illustrate computation of a motion-blur effect in the context of a computer graphics method.

Returning again to computer graphics, FIGS. 21A/21B illustrate how motion-blur is computed. In scenes without motion-blur, the robust interval analysis method of FIGS. 5-6 can be used to compute solution vectors, e.g., error-bounded projections of P, for a rectangular array of pixel or sub-pixel fragments which comprise a digital image, e.g., FIG. 21A.

When rendering is finished, the two-dimensional area of each pixel is integrated, e.g., the intensity values of sub-pixel fragments in FIG. 21A are convolved with a weighting function to produce a single result for each pixel. Motion-blur, however, is a time-averaged projection of solution vectors, e.g., error-bounded projections of Q. As a consequence, each pixel or sub-pixel fragment must be able to "accumulate" solution vectors at different time intervals so integration can be performed over the additional parameter domain, namely, the time domain, as well. As depicted in FIG. 21B, this is accomplished by allocating extra storage for each pixel or sub-pixel fragment, which results in an image comprised of voxels, i.e., "volume" pixels. More specifically, the shutter interval of a simulated camera exposure is quantized into N discreet time intervals. In FIG. 21B, N=16 (i.e., t=0 . . . t=15). As solution vectors of Q are computed, they are correlated and/or associated with a pixel and/or sub-pixel fragment according to their quantized x, y and t interval solutions. When rendering is finished, the three-dimensional volume of each pixel is integrated, i.e., the intensity values of sub-pixel fragments in FIG. 21B are convolved with a weighting function to produce a single result for each pixel.

There are some problems with such a straightforward implementation of a motion-blur effect. One problem is the increased cost of storage. The amount of memory required by an image comprised of voxels, e.g., FIG. 21B, is exponential compared to the memory requirements of a normal image, e.g. FIG. 21A. Perhaps more significantly, though, is a similarly exponential increase in the amount of computation time required to compute solution vectors for each sub-pixel fragment in the pixel volume. This exponential increase in computation time is a consequence of the previously discussed increase in size of the binary tree of the interval branch-and-bound method, e.g., FIG. 13. If heuristic undersampling methods are employed, e.g., FIG. 14 and/or FIG. 17, the computation time is significantly reduced, but many of the solution vectors which would normally appear in the pixel volume of FIG. 21B will be missing and/or absent due to the arbitrary nature in which the undersampling is performed. As a consequence, when integration of the pixel volume is computed, the result is artificially biased away from a robust solution. This may be acceptable for certain applications, such as interactive visualization and/or real-time graphics, but images computed with this method will certainly contain unrealistic and/or objectionable anomalies that are unacceptable for high-quality and/or photorealistic purposes.

Figure 22:
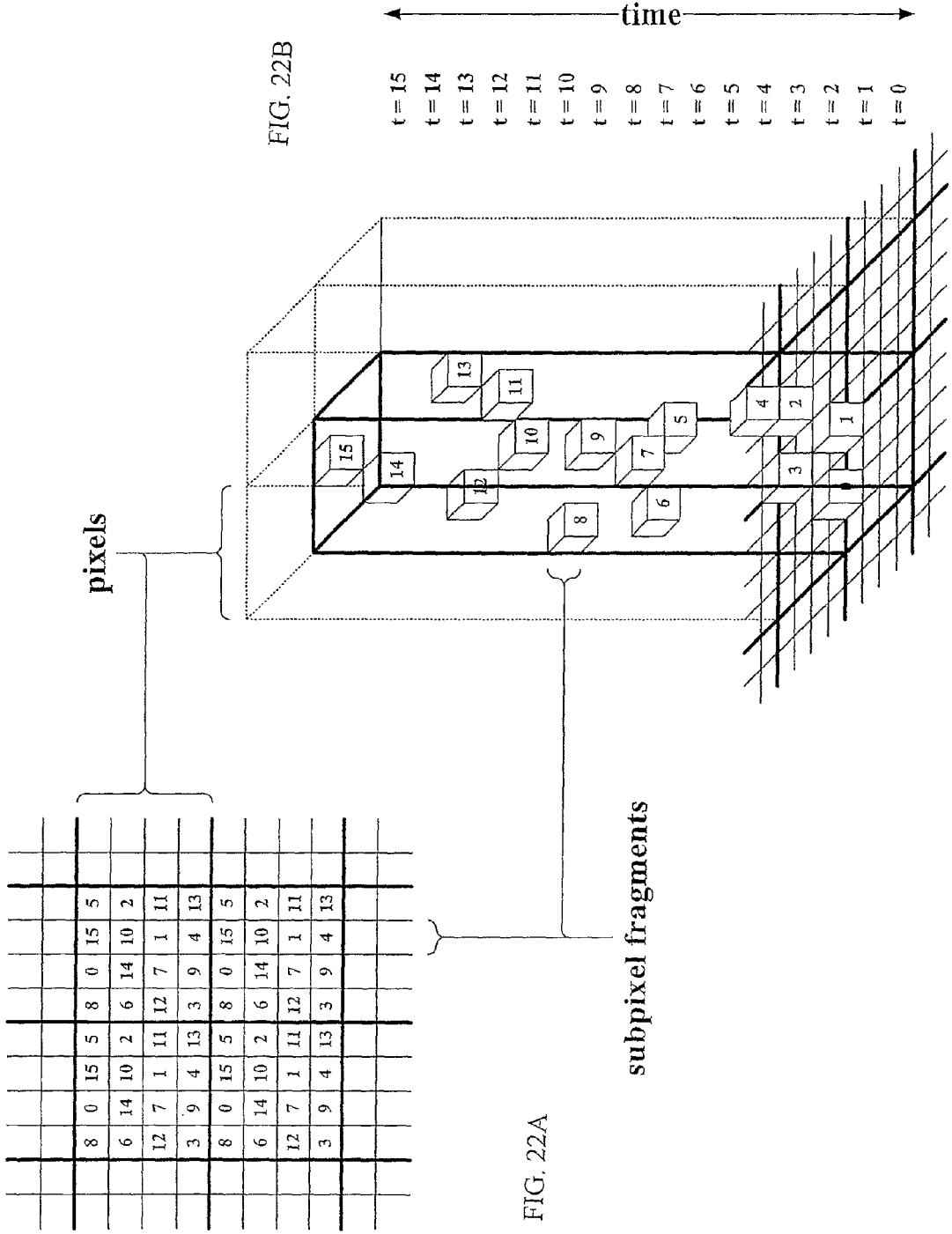
FIGS. 22A & 22B illustrate use of a correlation pattern to compute an improved motion-blur effect in the context of the present invention; and, FIG. 23 depicts, in the context of a robust interval analysis, a search vector of the present invention calculated from a tile vector and a solution vector.

FIGS. 22A/22B show how all of these problems are overcome. Borrowing from a strategy known in the prior art as "stratified sampling," each pixel volume is partitioned into a subset called a correlation pattern. In FIG. 22B, the correlation pattern is a subset of the pixel volume comprising, e.g., 16 sub-pixel fragments. Contrary to usage in the prior art, the sub-pixel fragments of the correlation pattern are not used to specify locations of point-samples. Rather, the correlation pattern in the context of the present invention represents a true volume subset of the (x,y,t)-space. As can be seen more clearly in FIG. 22A, each sub-pixel fragment in the correlation pattern associates a quantized interval of time with a unique (x,y) sub-pixel area. As a result, only the storage space of a normal image is required, not an exponential storage space for a full pixel volume, as in FIG. 21B.

Figure 23:
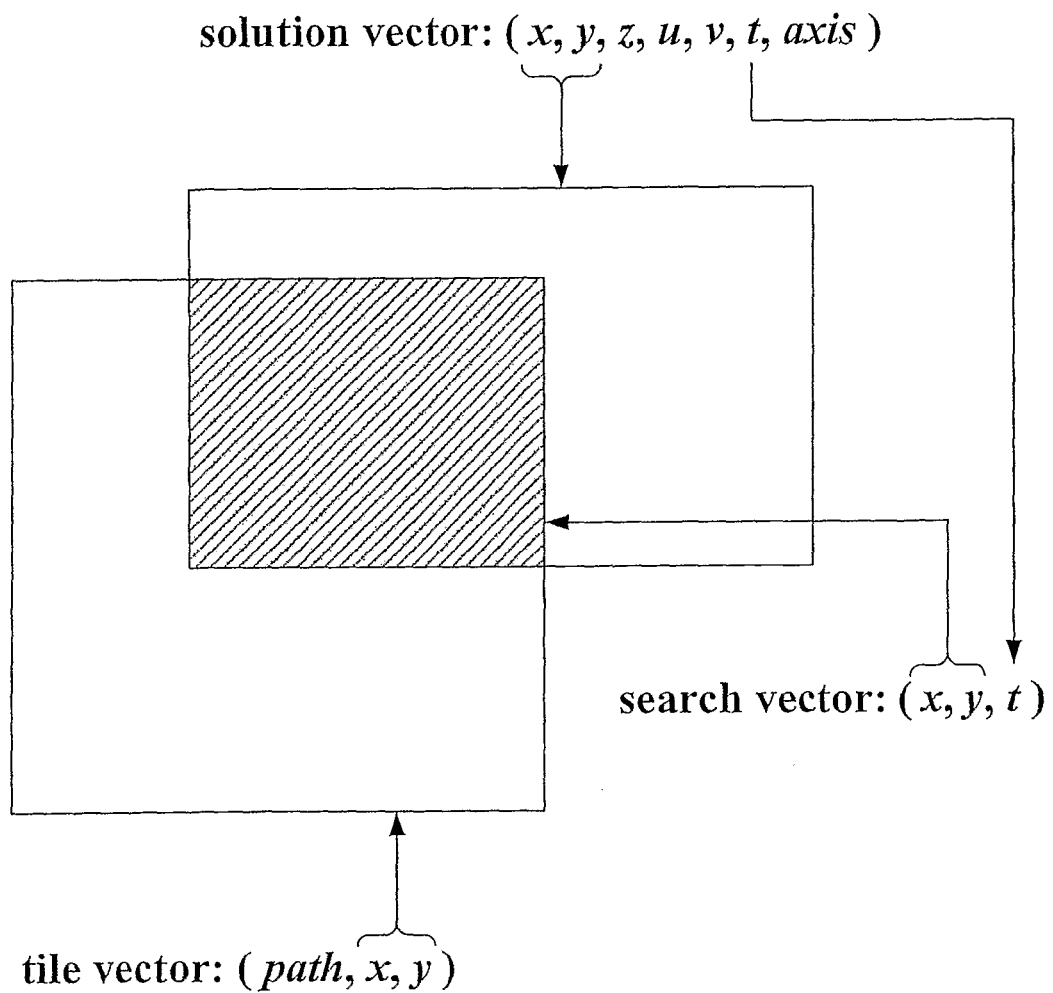

To perform interval undersampling in a robust manner, only a simple modification of the method in FIG. 6 is now required. Under normal circumstances, the consistency test in FIG. 6 simply checks for intersection between the (x,y)-area of a tile vector and the (x,y)-area of a solution vector. If an intersection does not exist, the solution vector does not belong to the visible solution set and is discarded, otherwise further processing of the solution vector occurs. In the context of the present invention, if the consistency check is true, a second check for intersection between an (x,y,t)-space search vector with a previously specified correlation pattern is performed. The x and y intervals of the search vector are computed as the (x,y)-intersection of a tile vector and a solution vector, as depicted by the shaded area in FIG. 23, and the t component of the search vector is set equal to the t component of the solution vector, also depicted in FIG. 23. If an intersection does not exist between the search vector and the correlation pattern, the solution vector is discarded; otherwise further processing of the solution vector occurs as normal. When rendering is finished, only the sub-pixel fragments associated with the correlation pattern, as shown in FIGS. 22A/22B, are integrated, i.e., they are convolved with a weighting function to produce a single result for each pixel.

The tricky part of implementing this method is in performing the intersection test between the search vector and the correlation pattern. As described previously, the correlation pattern is comprised of a collection of (x,y,t)-space interval boxes, e.g., FIG. 22B. This makes intersection testing with a search vector non-trivial. In practice, all of the (x,y,t)-space interval boxes of the correlation pattern can be sorted into an efficient and searchable data structure, such as, but not limited to, a kd-tree. This reduces intersection testing to simply conducting an orthogonal range search on the kd-tree over the entire (x,y,t)-volume of the search vector. Such data structures and searching methods are well-known in the prior art and provide fast, efficient intersection queries in logarithmic time. If such a search yields any positive results, then an intersection between the search vector and the correlation pattern exists, otherwise there is no intersection.

The present invention has described a method of checking for intersection between a search vector and a correlation pattern. The consequence and/or result of employing this method is correlated undersampling. The behavior of correlated undersampling in an interval branch-and-bound method is similar to the "random walk" undersampling method of FIG. 17. The difference, however, is that the pattern of discarded branches in the binary tree of FIG. 17 is driven by the correlation pattern in FIG. 22, as opposed to some heuristic selection process. When combined with the pseudo-random bisection method of FIG. 9, the sampling pattern depicted in FIGS. 19-20 is no longer arbitrary and/or heuristic. Rather, it is robustly computed in a deterministic manner so as to match the correlation pattern in FIG. 22. For this reason, correlated undersampling is truly a robust computational method. In this sense, correlated undersampling advantageously combines the best of both worlds, e.g., it combines the linear computational time of a heuristic undersampling method without sacrificing the strong guarantee of a robust computational method. This marriage of advantageous features represents an ideal, making it a significant improvement over heretofore known approaches.

Correlated undersampling can be extended further into additional dimensions or parameters. Depth of field rendering effects, for example, can be easily achieved. The previously discussed functions P and Q assume a pinhole camera model, but a real camera lens operates on a more sophisticated model that includes a focusing apparatus which involves an area on the lens known as a circle of confusion. Mathematical models for the circle of confusion are well known in the art, and as a consequence of incorporating this more realistic model into a rendering process, geometric objects that do not lie in the focal plane of the camera appear blurry, just as in the case of a real-world camera.

By introducing the parametric variables r and s, which represent a location within a circle of confusion on a virtual camera lens, and by incorporating the more realistic camera model into the previously discussed functions P or Q, a geometric function for reconstructing an image with depth-of-field effects is achieved. Specifically, if the more realistic camera model is incorporated into the function Q, for example, a geometric function R(u,v,t,r,s)=(x,y,z) can then be used to render any parametric surface taking into account both motion-blur and depth-of-field effects. For R, the extra dimensions in the parametric domain, namely the parametric variables r and s, result in an even larger binary tree than that associated with or corresponding to P or Q in the branch-and-bound algorithm, as depicted previously in FIG. 13. By virtue of the correlated undersampling method, e.g., FIGS. 22A/22B, and FIG. 23, the render time only increases linearly, not exponentially. To extend the methods of FIGS. 22A/22B, and FIG. 23 to R, the correlation pattern of FIG. 22A/22B becomes a 5-dimensional (x,y,t,r,s)-space, as does the search vector of FIG. 23, e.g., the extra r and s intervals are copied from a solution vector into a search vector in exactly the same manner as shown for the t interval in FIG. 23. Additionally, when used in conjunction with the pseudo-random interval bisection method, i.e., FIG. 9, the reconstructed image is free from objectionable patterns and/or aliasing that otherwise occur as a result of sampling with the interval arithmetic over regular intervals.

Although undersampling methods in the context of rendering parametric functions are the only examples which have been discussed, it should be obvious that the methods of the present invention are easily applied to the more simple case of rendering implicit functions, as well. For example, an (x,y,t)-space search vector can be easily constructed from a partitioning of a screen and/or pixel coordinate system which naturally occurs during the rendering of an implicit function representing a motion-blur, such as I(x,y,z,t)=0, as the implicit function is a projection of a zero-set into the screen and/or pixel coordinate system of an image. More details on robust interval methods for rendering of implicit functions can be found in Applicant's previously referenced publication on computer graphics.

As should be obvious in all cases, the correlation pattern need not be constrained to an area of a pixel. Correlation patterns spanning the area of an entire neighborhood of pixels are easily accommodated by the method of the present invention.

There are other variations of this invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

What is claimed:

1. In a method of photorealistic image synthesis characterized by a two dimensional display of integrated three dimensional digital scene information animated over a select time interval, the three dimensional digital scene information delimited by a geometric function relating a set of interval variables to an image space comprising a pixel domain, the set of interval variables including at least the select time interval, the steps comprising:
   a. partitioning pixels of the pixel domain into subpixel fragments wherein each subpixel fragment of said subpixel fragments delimits a unique area of the pixel domain;
   b. defining a correlation pattern for said subpixel fragments, said correlation pattern associating said unique area of the pixel domain delimited by each subpixel fragment of said subpixel fragments to a unique portion of the select time interval;
   c. partitioning the set of interval variables of the geometric function in furtherance of deterministically ascertaining a characteristic contribution of the set of interval variables to the image space comprising said unique area of the pixel domain delimited by each subpixel fragment of said subpixel fragments;
   d. deterministically defining and discarding, via said partitioning, a select portion of discarded interval variables of the set of interval variables of the geometric function, said select portion of discarded interval variables comprising partitioned interval subsets of the set of interval variables of the geometric function wherein said partitioned interval subsets contain, as a result of said partitioning, a deterministically partitioned interval subset of the select time interval that does not intersect said unique portion of the select time interval associated, via said correlation pattern, with said unique area of the pixel domain delimited by each subpixel fragment of said subpixel fragments; and,
   e. integrating the characteristic contribution to the image space of the set of interval variables that do not belong to said select portion of discarded interval variables in order to synthesize a display result for each pixel of the pixel domain of the two dimensional display.

* * * * *